United States Patent
Suh et al.

(10) Patent No.: US 7,077,573 B2
(45) Date of Patent: *Jul. 18, 2006

(54) CONTACT BEARING

(75) Inventors: Nam P. Suh, Sudbury, MA (US); Matthew Sweetland, Medford, MA (US)

(73) Assignee: Tribotek, Inc., Cambridge, MA (US)

(*) Notice: Subject to any disclaimer, the term of this patent is extended or adjusted under 35 U.S.C. 154(b) by 163 days.

This patent is subject to a terminal disclaimer.

(21) Appl. No.: 10/310,451

(22) Filed: Dec. 5, 2002

(65) Prior Publication Data

US 2003/0174918 A1 Sep. 18, 2003

Related U.S. Application Data

(63) Continuation-in-part of application No. 10/167,070, filed on Jun. 11, 2002.

(60) Provisional application No. 60/416,872, filed on Oct. 8, 2002, provisional application No. 60/363,696, filed on Mar. 12, 2002, provisional application No. 60/297,427, filed on Jun. 11, 2001.

(51) Int. Cl.
- *F16C 33/02* (2006.01)
- *F16C 17/00* (2006.01)
- *F16C 23/04* (2006.01)
- *F23J 3/00* (2006.01)
- *F10D 11/02* (2006.01)

(52) U.S. Cl. ............... 384/125; 384/129; 384/192; 384/202; 384/297; 384/416; 15/104.01; 277/355

(58) Field of Classification Search ............... 384/129, 384/192, 202, 247, 261, 297, 275, 276, 416, 384/125; 15/428, 104.01; 277/355, 42, 277/420

See application file for complete search history.

(56) References Cited

U.S. PATENT DOCUMENTS

| | | | |
|---|---|---|---|
| 299,109 A * | 5/1884 | Brigham | 384/297 |
| 341,392 A * | 5/1886 | Swain | 384/297 |
| 356,332 A * | 1/1887 | Randolph | 384/297 |
| 608,916 A * | 8/1898 | Rivett | 384/297 |
| 1,194,463 A | 8/1916 | Bache | |
| 1,674,623 A | 6/1928 | Claus | |
| 1,762,181 A | 6/1930 | Marles | |
| 1,895,936 A | 1/1933 | Merrill | |
| 2,768,034 A | 10/1956 | Skinner | |
| 2,878,048 A * | 3/1959 | Peterson | 277/355 |
| 3,186,312 A | 6/1965 | Hott et al. | |
| 3,449,031 A | 6/1969 | Josephson | |
| 3,511,544 A | 5/1970 | Marley | |
| 3,561,770 A | 2/1971 | Corsi | |

(Continued)

*Primary Examiner*—Richard Ridley
*Assistant Examiner*—Colby Hansen
(74) *Attorney, Agent, or Firm*—Wolf, Greenfield & Sacks, P.C.

(57) ABSTRACT

A bearing adapted to support and allow controlled relative movement with an opposed bearing surface. The bearing is constructed to have a long life by incorporating a surface that addresses many causes of friction and wear. The bearing includes a plurality of support members extending from a base. Together, the plurality of support members can support a load applied to the base through an opposed bearing surface. Additionally, the plurality of support members allow sliding modes of motion between the opposed bearings. These support members can move independently to accommodate irregularities located between the support member and the opposed bearing, such that plowing is reduced and wear to the bearings is minimized. The support members may also be configured to allow certain non-sliding modes of motion between opposed bearing surfaces while resisting other non-sliding modes of motion.

13 Claims, 23 Drawing Sheets

U.S. PATENT DOCUMENTS

| | | |
|---|---|---|
| 3,601,455 A | 8/1971 | Spieth |
| 3,604,771 A | 9/1971 | Luzsicza |
| 3,635,534 A | 1/1972 | Barnett |
| 3,685,838 A | 8/1972 | Malmstrom |
| 3,773,338 A | 11/1973 | Fidler et al. |
| 3,809,443 A | 5/1974 | Cherubim |
| 3,913,985 A | 10/1975 | Orr et al. |
| 3,932,004 A | 1/1976 | Orndorff, Jr. |
| 4,022,479 A | 5/1977 | Orlowski |
| 4,042,282 A | 8/1977 | Haslett et al. |
| 4,063,786 A | 12/1977 | Rall |
| 4,109,976 A | 8/1978 | Koch |
| 4,114,902 A | 9/1978 | Orlowski |
| 4,142,618 A | 3/1979 | Fontaine et al. |
| 4,178,046 A | 12/1979 | Silver et al. |
| 4,220,377 A | 9/1980 | Phelps |
| 4,223,958 A | 9/1980 | Gray |
| 4,239,301 A | 12/1980 | Pannwitz |
| 4,248,485 A | 2/1981 | White et al. |
| 4,261,625 A | 4/1981 | Renaud |
| 4,263,243 A | 4/1981 | Wilson et al. |
| RE31,058 E | 10/1982 | Povejsil |
| 4,362,342 A | 12/1982 | Bushor et al. |
| 4,395,142 A | 7/1983 | Lobeck |
| 4,434,882 A | 3/1984 | Olschewski et al. |
| 4,456,845 A | 6/1984 | Cunningham |
| 4,466,620 A | 8/1984 | Orlowski |
| 4,486,104 A | 12/1984 | Vezirian et al. |
| 4,514,098 A | 4/1985 | Ippolito |
| 4,574,213 A | 3/1986 | Stevens |
| 4,577,379 A | 3/1986 | Kramer |
| 4,596,471 A | 6/1986 | Kramer |
| 4,600,202 A * | 7/1986 | Schaeffler et al. .......... 277/355 |
| 4,607,964 A | 8/1986 | Kramer et al. |
| 4,623,269 A | 11/1986 | Burg |
| 4,640,559 A | 2/1987 | Crotti |
| 4,706,968 A | 11/1987 | Orlowski |
| 4,721,175 A | 1/1988 | Butler |
| 4,732,398 A | 3/1988 | Biss |
| 4,748,862 A | 6/1988 | Johnston |
| 4,773,771 A | 9/1988 | Kramer |
| 4,826,145 A | 5/1989 | Moore et al. |
| 4,916,749 A * | 4/1990 | Urban et al. ................. 384/298 |
| 4,969,752 A | 11/1990 | Kubota et al. |
| 5,000,586 A | 3/1991 | Daxer et al. |
| 5,031,922 A * | 7/1991 | Heydrich ..................... 277/355 |
| 5,033,871 A | 7/1991 | Ide |
| 5,066,025 A * | 11/1991 | Hanrahan ................... 277/355 |
| 5,090,710 A * | 2/1992 | Flower ........................ 277/355 |
| 5,304,006 A | 4/1994 | Ide |
| 5,332,317 A | 7/1994 | Niwa et al. |
| 5,364,248 A | 11/1994 | Nakashima et al. |
| 5,372,430 A | 12/1994 | Orndorff, Jr. et al. |
| 5,409,242 A | 4/1995 | Gonnocci |
| 5,433,532 A | 7/1995 | Kawageo et al. |
| 5,476,326 A | 12/1995 | Ueno et al. |
| 5,501,472 A | 3/1996 | Brancher et al. |
| 5,518,318 A | 5/1996 | Orndorff, Jr. |
| 5,529,398 A | 6/1996 | Bosley |
| 5,531,079 A | 7/1996 | Tatematsu et al. |
| 5,558,444 A | 9/1996 | Ide |
| 5,564,836 A | 10/1996 | Ide et al. |
| 5,593,231 A | 1/1997 | Ippolito |
| 5,711,586 A | 1/1998 | Anderton et al. |
| 5,885,006 A | 3/1999 | Sheedy |
| 5,951,124 A | 9/1999 | Hoffart |
| 5,967,524 A | 10/1999 | Fedorovich |
| 5,975,534 A | 11/1999 | Tajima et al. |
| 5,980,112 A | 11/1999 | Matthews |
| 6,089,683 A | 7/2000 | Anderton et al. |
| 6,089,758 A | 7/2000 | Ward |
| 6,132,095 A | 10/2000 | Crystal |
| 6,139,020 A | 10/2000 | Friend et al. |
| 6,158,743 A | 12/2000 | Anderson et al. |
| 6,176,491 B1 | 1/2001 | Bertoni |
| 6,238,093 B1 | 5/2001 | Orndorff, Jr. et al. |
| 6,238,096 B1 | 5/2001 | Allen et al. |
| 6,280,090 B1 | 8/2001 | Stephens et al. |
| 6,290,396 B1 | 9/2001 | Forbes-Robinson |
| 6,300,701 B1 | 10/2001 | Ong et al. |
| 6,367,978 B1 | 4/2002 | Edwards |
| 6,808,179 B1 * | 10/2004 | Bhattacharyya et al. .... 277/348 |

* cited by examiner

Effective Spring Stiffness

Effective Spring Stiffness

Effective Spring Stiffness

Effective Spring Stiffness

CONTACT BEARING

CROSS REFERENCE TO RELATED APPLICATIONS

This application also claims the benefit of and is a continuation-in-part of U.S. patent application Ser. No. 10/167,070, filed on Jun. 11, 2002, which claims priority to U.S. Provisional Patent Application No. 60/297,427, filed Jun. 11, 2001. This application claims the benefit of U.S. Provisional Patent Application Nos. 60/363,696, filed on Mar. 12, 2002, and 60/416,872, filed on Oct. 8, 2002.

FIELD OF THE INVENTION

The present invention relates to a contact bearing and more particularly to a sliding contact bearing with an increased service life.

BACKGROUND OF INVENTION

Bearings are used in a wide variety of applications. Representative example applications include simple door hinges, internal combustion engines, heavy duty construction equipment, and other applications that may subject a bearing to corrosive materials, abrasive particles, or non-lubricated environments. In these applications and others, bearings support contact forces between connected objects while allowing the objects to move relative to one another, either through linear motion, rotational motion, or a combination thereof.

Wear is the degradation that can occur to a bearing through extended use. Wear is often caused by an increase in friction, which is the resistance to relative motion between objects. Some causes of friction contributing to wear include loose particles plowing (e.g. cutting) into the bearing and asperity (e.g., surface irregularities) interactions at the surfaces of the bearing.

Prior art bearings address plowing by providing one surface much softer than the surface it contacts. In this respect, a majority of plowing takes place in the softer material, resulting in less energy consumption and therefore less friction than would otherwise occur when employing relatively hard materials. Employing softer material may also allow a loose particle to be embedded into the softer surface and therefore be substantially removed from the interface between the surfaces. This also has the effect of reducing friction because the particle no longer interacts at the bearing surfaces. Prior art bearings also reduce plowing by introducing particle traps that reduce the amount of particles between bearing surfaces by allowing the particles to collect away from the bearing surface.

Asperity interactions have been addressed in the prior art. For example, by improving bearing surface finishes, the amount and severity of asperity interactions is reduced.

Plowing or asperity interactions are not as problematic for some types of bearings. For instance, plowing and asperity interactions are less of a concern for hydrodynamic bearings which do not normally make direct contact with each other during operation.

SUMMARY OF THE INVENTION

In one aspect of the invention, a contact bearing comprises a base with a resilient property and a plurality of support members extending from the base. The plurality of support members are constructed and arranged to support an opposed bearing surface. The resilient property of the base allows at least one of the plurality of support members to move to accommodate an asperity or debris disposed between the opposed bearing surface and the at least one of the plurality of support members while at least one adjacent support member maintains at least a portion of the support of the opposed bearing surface.

In another aspect of the invention, a contact bearing comprises a base and a plurality of support members extending from the base. The plurality of support members are constructed and arranged to support an opposed bearing surface. At least one of the plurality of support members being constructed and arranged to move to accommodate an asperity or debris disposed between the opposed bearing surface and the at least one of the plurality of support members while at least one adjacent support member maintains at least a portion of the support of the opposed bearing surface. Also, the plurality of support members each comprise a first area for contacting the opposed bearing surface and a second area engaged with the base, wherein the second area is larger than the first area.

In another aspect of the invention, a contact bearing comprises a base and a plurality of support members extending from the base. The plurality of support members are constructed and arranged to support an opposed bearing surface. At least one of the plurality of support members is constructed and arranged to move to accommodate an asperity or debris disposed between the opposed bearing surface and the at least one of the plurality of support members while at least one adjacent support member continues to support the opposed bearing surface. The plurality of support members are arranged in a matrix-like configuration.

In yet another aspect of the invention, a contact bearing comprises a base and a plurality of support members embedded in the base and extending from the base. The plurality of support members are constructed and arranged to support an opposed bearing surface. At least one of the plurality of support members is constructed and arranged to move to accommodate an asperity or debris disposed between the opposed bearing surface and the at least one of the plurality of support members while at least one adjacent support member maintains support of the opposed bearing surface. Each of the plurality of support members comprise a first end engageable with the opposed bearing surface and a second end embedded in the base.

In still another aspect of the invention, a contact bearing comprises a base and a plurality of elongated, pin-like support members extending from the base. The plurality of support members are constructed and arranged to support an opposed bearing surface. At least one of the plurality of support members is constructed and arranged to move to accommodate an asperity or debris disposed between the opposed bearing surface and the at least one of the plurality of support members while at least one adjacent support member maintains support of the opposed bearing surface.

In an additional aspect of the invention, a contact bearing comprises a base and a plurality of support members extending from the base. The support members are constructed and arranged to contact and support an opposed bearing surface. At least one of the plurality of support members is constructed and arranged to move to accommodate an asperity or debris disposed between the opposed bearing surface and the at least one of the plurality of support members while at least one adjacent support member maintains at least a portion of the support of the opposed bearing surface. A first set of the of the support members has a first flexing characteristic and a second set of the support members has a second flexing characteristic that is different from the first flexing characteristic.

In another aspect of the invention, a contact bearing comprises a base and a plurality of support members extending from the base. The plurality of support members are constructed and arranged to support an opposed bearing surface through sliding contact. At least one of the plurality of support members is constructed and arranged to move to accommodate an asperity or debris disposed between the opposed bearing surface and the at least one of the plurality of support members while at least one adjacent support member maintains at least a portion of the support of the opposed bearing surface. The plurality of support members are constructed and arranged to substantially resist a first non-sliding mode of motion between the contact bearing and the opposed bearing surface and to substantially allow a second non-sliding mode of motion between the contact bearing and the opposed bearing surface, where the first mode is different from the second mode.

In still another aspect of the invention, a contact bearing comprises a base and a plurality of support members extending from the base. The plurality of support members are constructed and arranged to support an opposed bearing surface in a sliding mode of motion. At least one of the plurality of support members is constructed and arranged to move to accommodate an asperity or debris disposed between the opposed bearing surface and the at least one of the plurality of support members while at least one adjacent support member maintains at least a portion of the support of the opposed bearing surface. A first set of the plurality of support members is constructed and arranged to allow the opposed bearing surface to move closer to the base and a second set of the plurality of support members constructed and arranged to substantially resist the opposed bearing surface from moving closer to the base.

Various embodiments of the present invention provide certain advantages and overcome certain drawbacks of prior contact bearings.

Embodiments of the invention may not share the same advantages, and those that do may not share them under all circumstances. This being said, the present invention provides numerous advantages including the noted advantage of increased service life and/or high performance characteristics.

Further features and advantages of the present invention, as well as the structure of various embodiments, are described in detail below with reference to the accompanying drawings.

BRIEF DESCRIPTION OF THE DRAWINGS

Various embodiments of the invention will now be described, by way of example, with reference to the accompanying drawings, in which.

DETAILED DESCRIPTION

Figure 1:
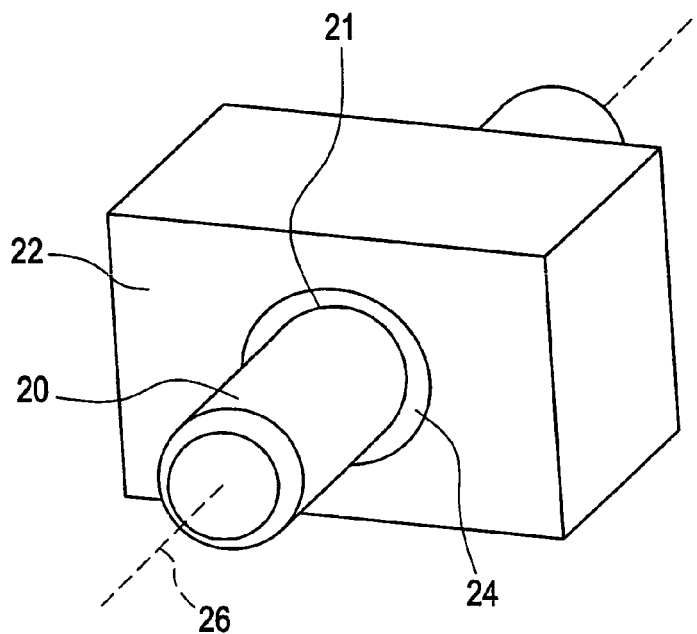
FIG. 1 is a perspective schematic representation of a system including cylindrical bearing according to one aspect of the invention.

The bearing of the present invention is adapted to support an opposed bearing surface and allow relative movement there between. The bearing is constructed to have a long life by incorporating a surface that addresses many causes of friction and wear.

In one aspect, as described in commonly assigned co-pending U.S. patent application Ser. No. 10/167,070, which is hereby incorporated herein by reference in its entirety, the bearing may include a locally compliant surface formed of a plurality of support members extending from a base. Together, the plurality of support members can support a load applied to the base through an opposed bearing surface while allowing sliding movement there between. The support members can move or flex independently to accommodate irregularities, such as asperities or loose particles located between the support members and the opposed bearing. In this sense, some "local" areas of the bearing may be considered compliant so as to accommodate the irregularity. Accommodating irregularities with such a locally-compliant surface can reduce wear and contribute to prolonged bearing life.

Various structures may be used to form a locally compliant bearing. In some embodiments, locally compliant bearings are formed with cantilevered beams integral with and extending from a base. The nature of the cantilevered structure allows the support members to flex. In other embodiments, support members extend from a base that has a resilient property (e.g. one with a relatively low Young's Modulus of elasticity), with the resilient property of the base allowing the support members to flex. The support members may also be embedded in the base. Additionally, an increased contact area between the embedded support members and the base may reduce stress there between, which can prolong the life of the bearing.

The bearing may also allow some non-sliding modes of motion where a portion of the bearing and to the opposed bearing surface move closer to each other. In such aspects, a set of the support members may collectively move to help distribute a load between the opposed bearing surface and support members. In this sense, some "global" areas of the bearing may flex to accommodate the load. This collective or global movement may reduce the peak contact pressure. Reduced peak pressures in such globally compliant bearing surfaces can increase bearing life.

In still other aspects, more flexible portions of the bearing may allow greater compression with an opposed bearing surface, and thus allow a degree of some non-sliding modes of motion. Other portions of the bearing may be less flexible and allow less compression, thereby resisting other non-sliding modes of motion. More flexible support members, a more flexible resilient base, or fewer support members can be used in the portions of the bearing where more flexible characteristics are desired. A bearing with varying degrees of flexibility may be designed to have customized compliance. Such a bearing may also have the benefit of increased bearing life in the particular application for which it is designed.

One or more of the above-described features may be incorporated into the bearing, each independently or in combination, contributing to prolonged bearing life and/or lower friction throughout the life of the bearing.

Turning now to the figures and in particular to FIGS. 1–4, an embodiment and an application of the present invention are shown. FIG. 1 shows a shaft 20 mounted within an object 22 through a cylindrical bearing 24. This arrangement is designed to allow sliding modes of motion between the shaft and object, such as rotation about the central axis 26 of the shaft or translation along the central axis. The bearing 24 aids relative movement between the shaft and the object by providing a load carrying surface 21 with reduced frictional properties. The bearing 24 may also be removed and replaced, which can eliminate the need to replace an entire shaft or mating object when one of the bearing surfaces 21 is damaged or worn. The bearing 24 of FIG. 1 may be fixedly attached to the shaft 20, the object 22, or allowed to float relative to both the shaft and the object. It may comprise a complete cylindrical section, or multiple sections that together form a complete or partial cylinder. A pair of two separate bearings arranged concentrically may be employed with the first bearing fixedly attached to the shaft 20 and the second being fixedly attached to the object 22 and opposed to the first bearing. Alternatively, the shaft and/or the object may provide an opposed bearing surface that makes direct contact with the bearing 24.

The bearing allows sliding contact to occur in a controlled manner. That is, certain sliding modes of motion between opposed bearing surfaces are allowed while other non-sliding modes of motion are prevented or substantially limited. The term "sliding mode of motion" as used herein describes motion where the amount of compression between opposed bearings, or equivalently the amount of movement of the support members remains substantially constant. For instance, the cylindrical bearing 24 of FIG. 1 allows the shaft to rotate about the central axis 26 and to translate along the same axis. In each of these modes of motion, the amount of movement of the support members remains substantially constant. Opposed bearing surfaces generally move in directions parallel to one another during sliding modes of motion. If the shaft of FIG. 1 were to be moved in a direction perpendicular to the central axis or rotated about an axis other than the central axis, parts of the shaft surface would move nearer to or be compressed more with the support members while other parts would move further away from or be compressed less with the support members. These are examples of non-sliding modes of motion. Sliding modes of motion can and often occur simultaneous with non-sliding modes of motion. In this manner, when a non-sliding mode is occurring simultaneously with a sliding mode, the term non-sliding mode is used to describe the non-sliding portion of the motion. Stating that a non-sliding modes of motion is occurring does not mean that sliding motion cannot also be occurring. Additionally, stating that a sliding mode of motions is occurring does not mean that non-sliding modes of motion cannot also be occurring.

Figure 2:
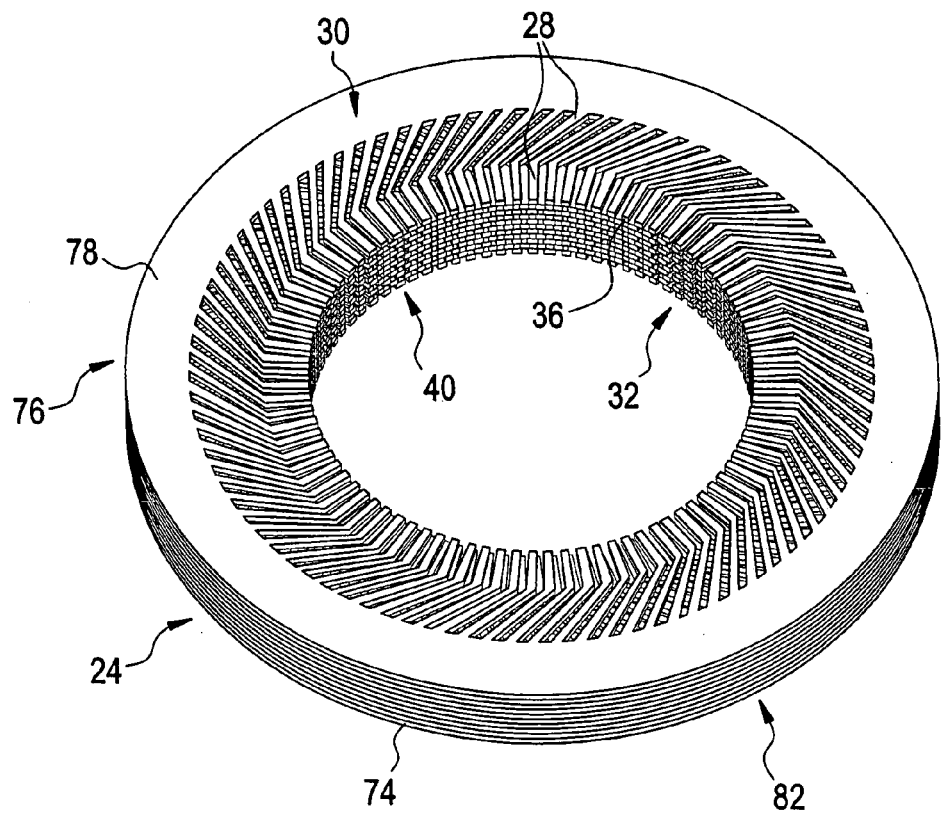
FIG. 2 is a perspective view of a cylindrical bearing according to another aspect of the invention.
Figure 2A:
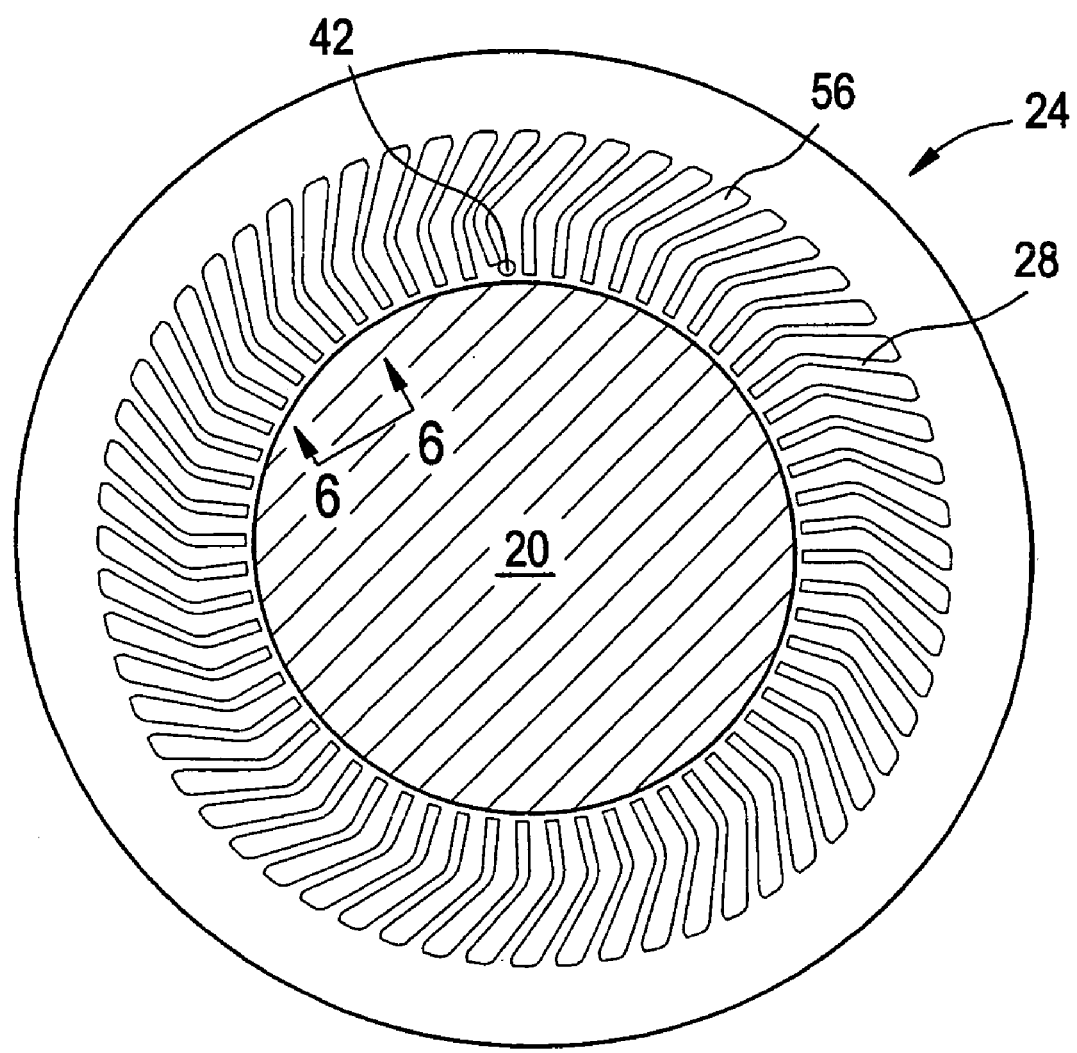
FIG. 2A is a schematic end view of a bearing according to another aspect of the invention.
Figure 3:
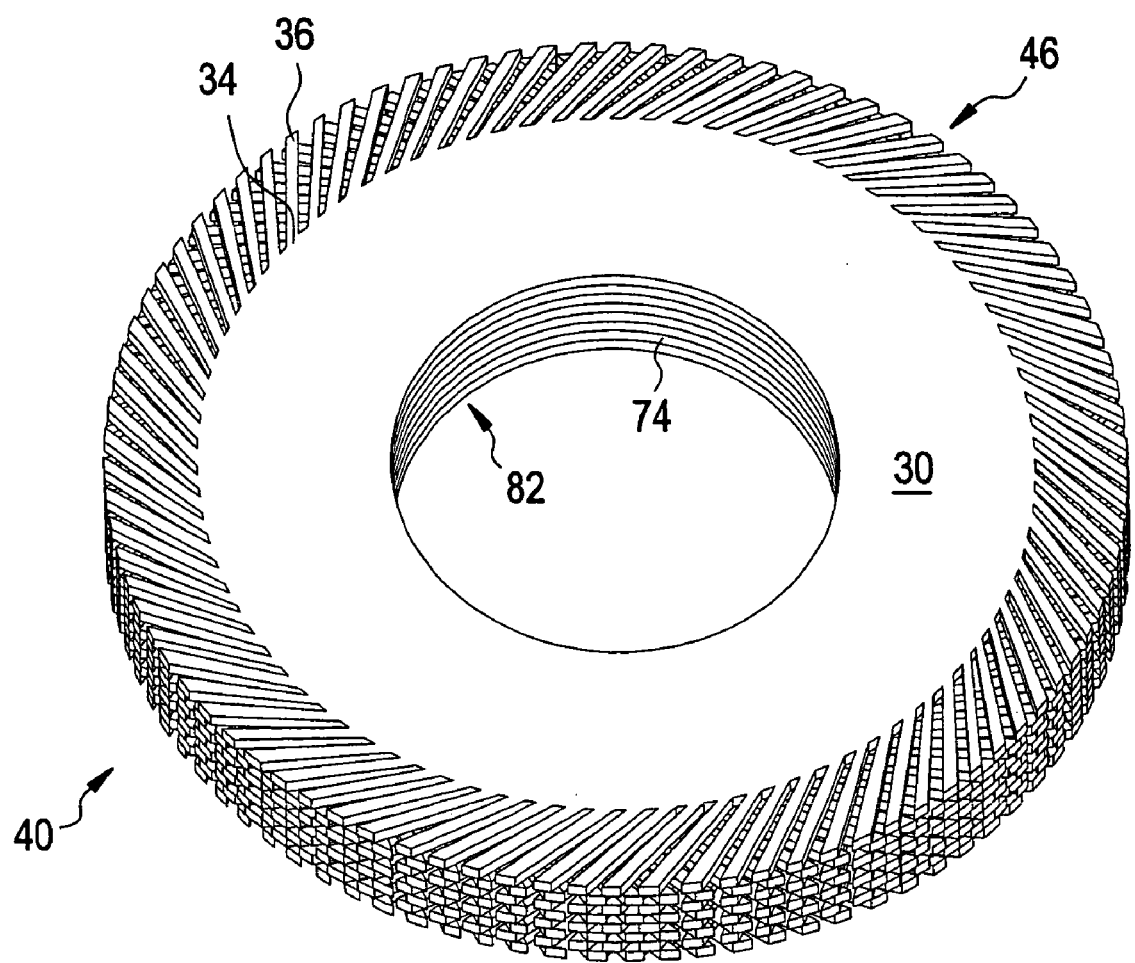
FIG. 3 is a perspective view of a cylindrical bearing according to yet another aspect of the invention.
Figure 4:
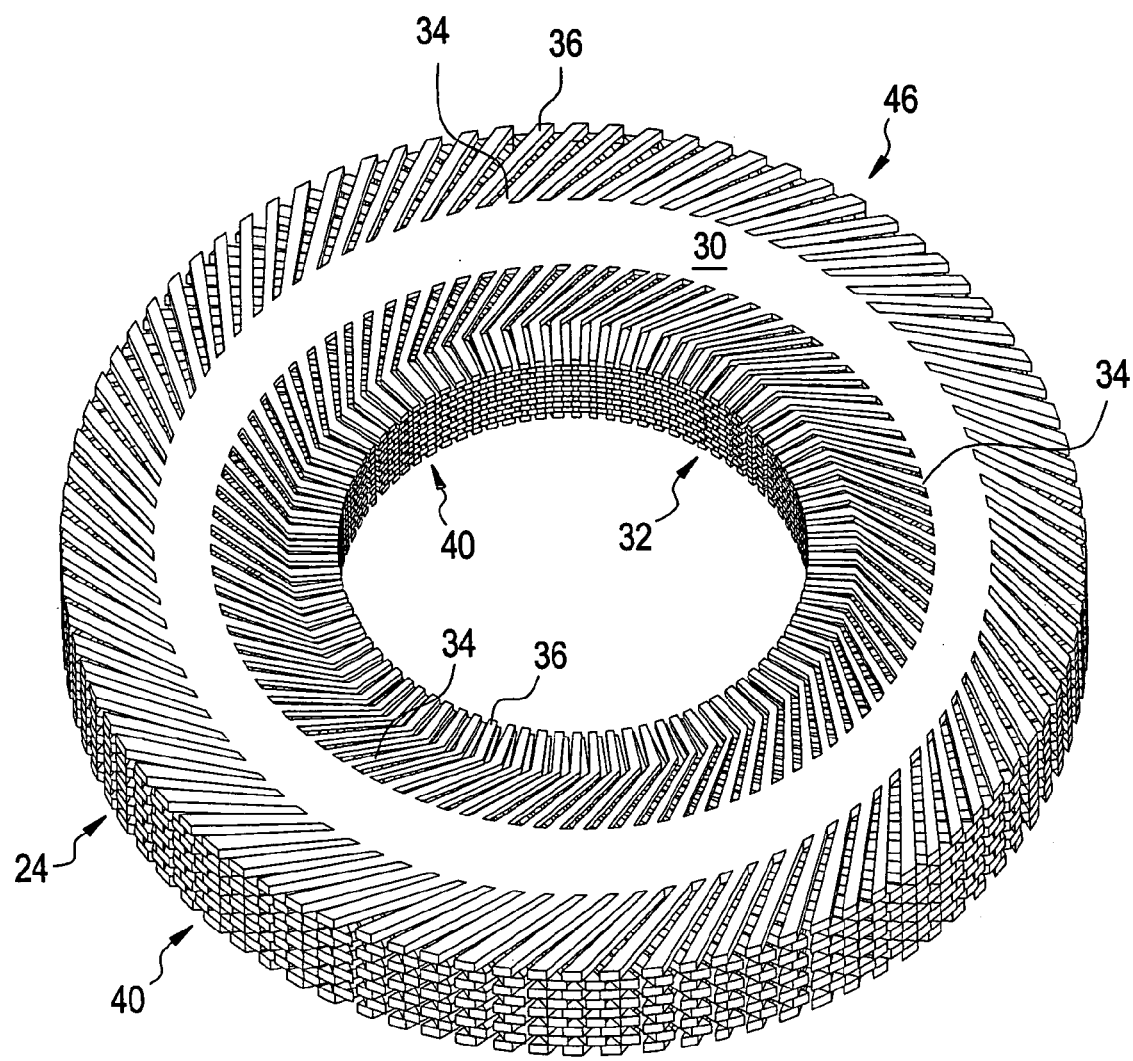
FIG. 4 is a perspective view of a cylindrical bearing according to still another aspect of the invention.

As shown in FIGS. 2–4, a locally compliant surface 40 may comprise a matrix-like arrangement or array of support members 28 extending from a base 30. The support members in this embodiment cooperate to form an inner surface 32 of the cylindrical bearing 24 to support an opposed bearing surface of a cylindrical shaft (not shown). Each of the support members 28 comprise a first end 34 attached to the base and a second end 36 adapted for contacting and supporting the shaft in sliding contact. These support members 28 can move independently to allow the surface to accommodate loose particles and thereby reduce damage that may otherwise occur due to plowing. The independent movement also allows the surface to reduce damage incurred from contact with asperities or other surface irregularities. In this sense, the surface 32 can support an opposed bearing surface while independent movement of the support members accommodates irregularities at "local" points on its surface. For this reason, the surface is described as being "locally compliant." In the embodiment shown in FIGS. 2 and 2A the support members are formed on an inner cylindrical surface 32. In FIG. 3, the support members are shown on an outer cylindrical surface 46. In FIG. 4, the support members are shown on both the inner 32 and the outer 46 cylindrical surface.

The independent movement of a support member reduces the pressure exerted between the opposed bearing surfaces and any irregularities by allowing other support members to carry more of the load between the opposed bearings. This prevents surface irregularities, such as asperities, from being subjected to higher pressures that might remove them from bearing surfaces and allow them to become loose particles. It also prevents loose particles or surface irregularities from being subjected to higher pressures that might cause them to plow into bearing surfaces before they can be removed from between the bearing surfaces. The support members are biased toward the opposed surface, so the support can move back to directly support the opposed surface once it has flexed to accommodate an irregularity.

Figure 5A:
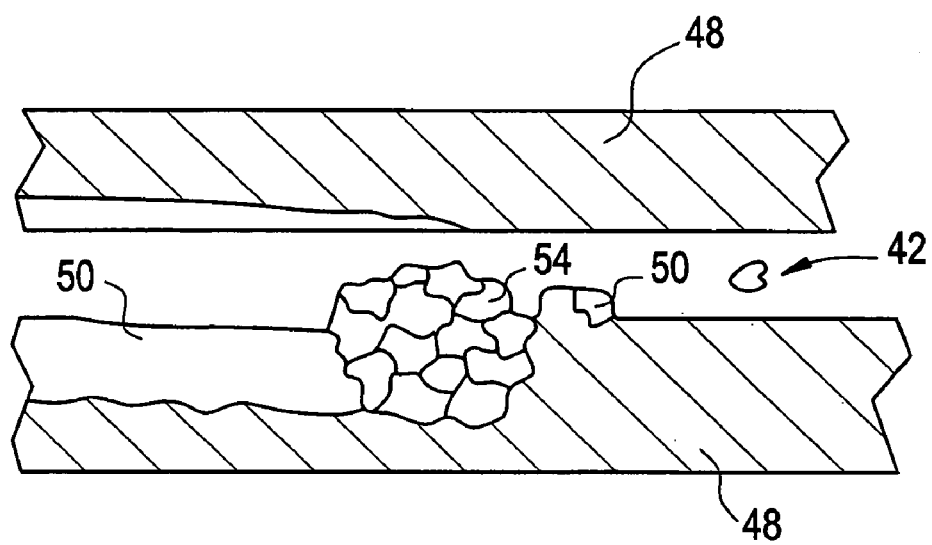
FIG. 5A is a schematic representation of plowing between two opposed bearing surfaces.

As mentioned, a locally compliant surface addresses several of the causes of wear and friction. Some of these causes, including plowing of a bearing by loose particles and damaging of a bearing by asperity interactions, are now described in greater detail. Plowing is represented in FIG. 5A where two conventional bearings 48 are shown sliding relative to one another with an agglomerated particle 54 lodged between the bearings. Interaction of asperities 44 between two opposed conventional bearings 48 is shown in FIG. 5B.

In plowing, a particle 42 or an agglomerated particle 54 located between opposed bearings creates a high contact pressure point as the load carried between the opposed bearings is concentrated about the agglomerated particle. This high contact pressure can cause the particle to lodge in a bearing 48 and cause damage. As the bearings 48 continue to slide relative to one another, the lodged particle is dragged along one or both of the bearing surfaces causing further damage, most typically in the form of a furrow 50 characterized by a groove with raised edges. In addition to causing wear damage, the process of creating the furrow 50 and the rougher surface left by the furrow increase friction between the bearing surfaces.

As particles plow into a bearing, they can create additional wear particles 42 that may break away from the bearing. These new particles may agglomerate into larger particles that can lodge in the bearing surfaces and cause further plowing damage. As this phenomenon continues, delamination may occur on one or both of the bearing surfaces. Delamination is the removal of material from one of the bearing surfaces in a sheet-like fashion. Delamination is destructive to the bearing surface and often results in significant wear, increased friction and potentially even catastrophic failure.

Figure 5B:
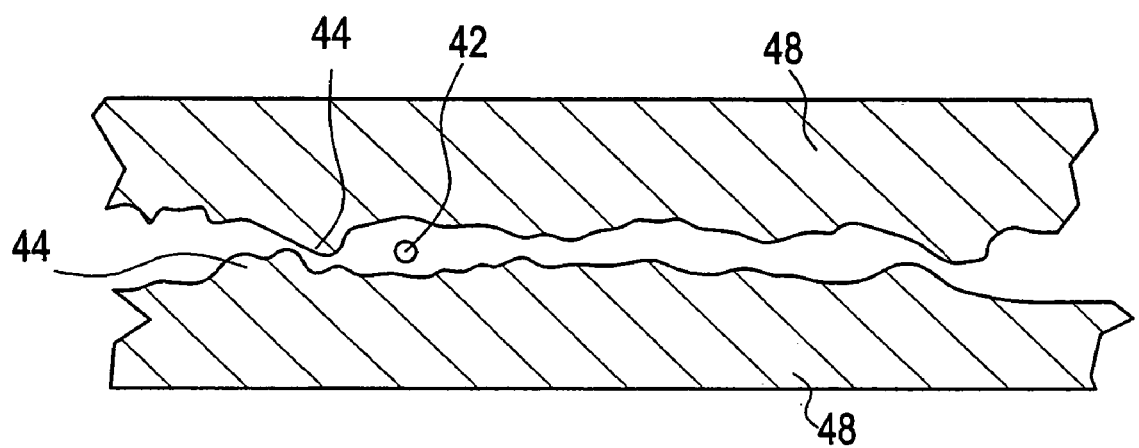
FIG. 5B is a schematic representation of asperity interaction between two opposed bearing surfaces.

An asperity 44, as used herein, is a small protrusions that may exist at some level on bearings 48 as shown in FIG. 5B. Many of these asperities will be forced into contact with asperities 44 of the opposed bearing surface when the surfaces are placed in contact with one another to carry a load. While asperity interaction occurs on some levels to support contact forces between bearing surfaces, larger asperities will contribute greater to friction and wear between the surfaces. Asperities 44 may also break away from a surface as they interact, thereby becoming loose particles 42. Most asperities range in size between 1–5 microns across, but can range from 0.5–30 microns across and beyond, depending on the manufacturing process used to make the surface. Asperities that break away from a surface and remain between the bearings as they move relative to one another can agglomerate into larger particles that can contribute to the plowing phenomenon. Agglomerated particles 54 may range in size between 5 microns to several hundred microns. Other foreign debris particles that can also cause plowing, typically range in sizes between 20 and 80 microns. However, any particle that can fit between opposed bearing surfaces can be considered foreign debris and can also cause plowing.

Figure 6:
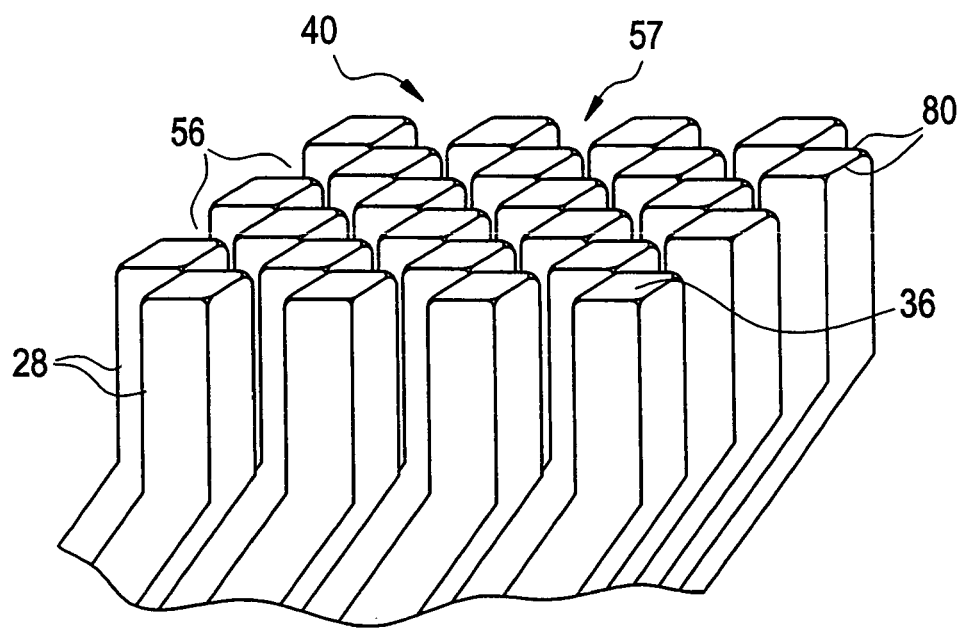
FIG. 6 is a schematic perspective representation taken along lines 6—6 of FIG. 2A, showing a plurality of support members formed on a bearing according an aspect of the invention.

Returning now to the embodiments of the present invention, FIG. 6 shows a close up view of the support members represented in FIG. 2A. Here, the locally compliant surface 40 comprises multiple support members 28 having end portions extending perpendicularly from a base 30. In this embodiment the support members are square in cross sections with a length of approximately three to fifteen times their width, although the invention is not limited to these geometries as numerous other geometries contemplated by the invention. The support members are spaced apart to define gaps 56 there between. The gaps 56 in this embodiment have approximately the same cross-sectional dimensions as the support members themselves. They provide an easy removal path for particles between the opposed bearings. Once in such a gap 56, the tendency of the particle to inflict bearing damage is reduced. If the particle does not fall into a gap, it eventually may be removed from between the bearings, likely by exiting through an edge 57 of the bearing.

The embodiment shown in FIG. 6 has gaps 56 arranged on four sides of each support member 28. However, in other embodiments the gaps may extend continuously from one edge 57 of the bearing to an opposite edge of the bearing, creating a clear path through the bearing from on side to another. Such a path may provide easy access to the gaps for cleaning out accumulated particles. The embodiment shown in FIG. 6 also shows support members arranged in a matrix-like fashion with similar sized gaps on either side of the support members. However, other embodiments may have support members arranged in any other regularly spaced matrix-like configuration or even in irregular, matrix-like arrangement as the invention is not limited in this respect. The gaps are also shown to be substantially separated from other gaps by the support members. However, the gaps could also extend continuously around all sides of the support members or take on other shapes as the invention is not limited in this respect.

Figure 7:
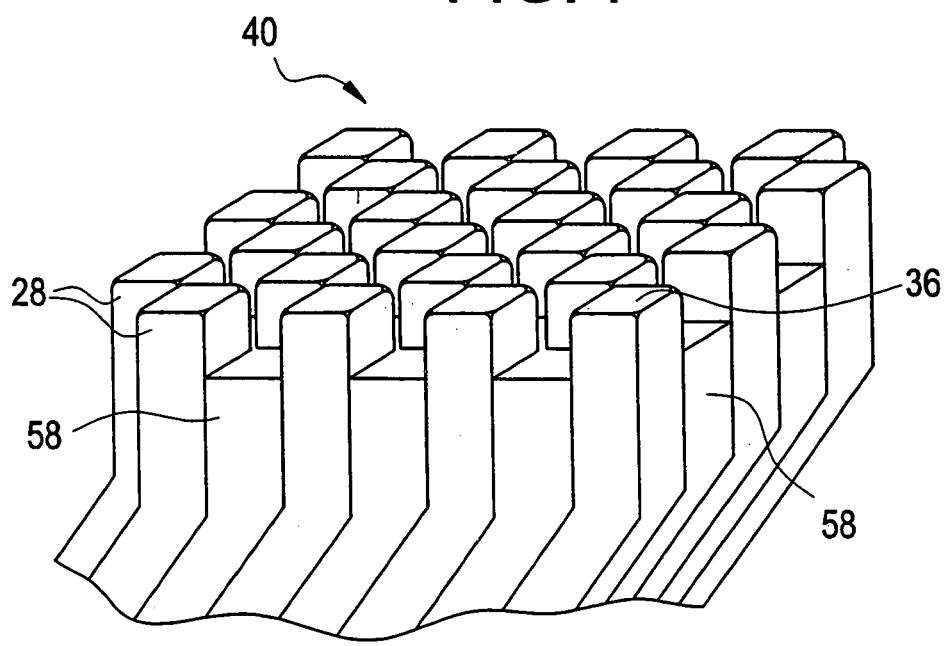
FIG. 7 is a schematic perspective representation of a plurality of support members formed on a bearing with material disposed in the gaps defined by the support members.

In another embodiment, such as that shown in FIG. 7, a material 58 is disposed in the gaps 56 defined by adjacent support members. This material may be present in some or all of the gaps 56. It may fill entire gaps or only portions of gaps as the invention is not limited in this respect. It may support the members 28 further or it may simply comprise a space filling substance to prevent the accumulation of loose particles which could otherwise lodge therein and prevent the support members from flexing efficiently. Such a substance might be a highly flexible material that does not adversely affect the flexing of support members. In other embodiments, the material may comprise a lubricant that can be paid out to the bearing over time. This may occur naturally as the support members wear, as heat generated in the bearing causes the lubricant to change viscosity and migrate towards the bearing, or through other mechanisms. In other embodiments, some of the support members (e.g. every fifth support member) may be made of a solid lubricant such as graphite that is paid out to the bearing surfaces over time.

Returning now to the cylindrical bearing of FIG. 2, a bearing with a locally compliant inner surface to allow sliding modes of motion between a shaft 20 and another object 22 is shown. FIGS. 3 and 4 show alternate embodiments of a locally compliant cylindrical bearing. The embodiment of FIG. 3 has a locally compliant outer cylindrical surface 46. This bearing may be fixed to the outer surface of a shaft to allow sliding modes of motion between an object 22 and the shaft. The embodiment of FIG. 4 has locally compliant surfaces 40 on both its inner and outer cylindrical surfaces. This bearing may be located between a shaft 20 and the inner cylindrical surface of another object (not shown) to support relative translation and/or rotation between the shaft 20, the bearing 24 and object as it floats between the surfaces of the shaft 20 and the object 22. While the locally compliant surfaces 40 of these bearings are designed to contact a conventional bearing or shaft, they may also contact another bearing with a locally compliant surface.

The outer cylindrical surfaces of the embodiments in both FIGS. 3 and 4 have linear support members arranged in directions that are non-perpendicular to the base. The inner cylindrical surfaces 32 of the embodiments in FIGS. 2 and 4 have "dog-leg" shaped support members with their second portion 36 aligned somewhat perpendicular with the base 30. The first portion 34 of the dog-leg members has a substantially constant cross-sectional area, which creates gaps 56 between the support members that are larger in cross-sectional area at points closer to the base 30. This provides a greater amount of room for holding loose particles 42 that are removed from between the support members and the opposed bearing. While these bearings are shown with particular, locally compliant surfaces 40, the present invention is not limited in this respect.

FIGS. 2, 3 and 4 show some support members 28 extending from the same side of a base 30 (e.g. the outer cylindrical surface or the inner cylindrical surface) but in different directions. In these particular configurations, support members 28 bending toward an adjacent support members that extends in a different direction will likely contact the adjacent support member after bending a short distance. Otherwise, support members may move a greater distance when bending in other directions. In this manner, the support members 28 may be adapted to move differently in different directions. Similar results may be obtained by modifying the cross-sectional shape of the support members. For instance, a rectangular cross-section will have different bending characteristics in the various directions. Of course, the present invention is not limited in this respect as the support members may have any flexing characteristics or may extend in the same direction or any combination of different directions.

The embodiments of FIGS. 2–4 show support members that are integral with and cantilevered from the base. While the support members shown in these figures are relatively large, it may be preferable to have numerous, relatively small, support members that comprise the locally compliant surface of the bearing. For instance, support members with cross-sectional areas of 100 square microns and smaller are desired in some embodiments. However, applications with particular loading requirements, or applications that are expected to be exposed to larger, loose particles may benefit from fewer and/or larger support members. Additionally, the costs associated with creating numerous, small support members may make bearings with less, but larger support members more desirable. In one embodiment, the support members have a square cross-sectional area of approximated 0.4 mm by 0.4 mm at their second end. In another embodiment, they have a cross-sectional area of 1 mm by 1 mm. In still other embodiments, the second ends may have cross-sectional areas up to 2 mm by 2 mm. Additionally most support members are three to fifteen times long as they are wide. Other suitably sized support members may be employed, as the present invention is not limited in this respect. Packing density is a descriptive characteristic of locally compliant surfaces that relates generally to the number and size of support members used to form a locally compliant surface. Packing density is defined by the contact area between the support member ends and the opposed bearing surface divided by a projected area of the opposed bearing surface that they support. Most embodiments have a packing density of about 50%–60% although greater or lesser packing densities are possible.

Figure 8A:
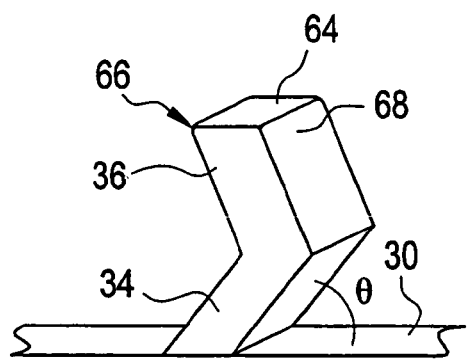
FIGS. 8A–8D shows schematic perspective representations of several embodiments of support members formed on a bearing.

As was discussed with respect to FIGS. 2 and 4, the support member may be formed as a "dog-leg" comprising a first linear portion 34 and a second linear portion 36 as is also shown in FIG. 8A. Either of these linear portions 34, 36 may be aligned perpendicular to the base 30 (as shown in FIGS. 2 and 4) or they may both be non-perpendicular the base (as shown in FIG. 8A). The cross-sectional area of the first and second portions of the dog-leg may be of identical length and cross-sectional area or one portion may be greater than the other in either or both respects. Where the second portion 36 of a support member is non-perpendicular to the base 30 (as shown in FIG. 8A), a wedge shaped side 66 of the distal end face 64 may help direct loose particles 42 into the gaps 56 as they approach the wedge shaped side 66. The side 68 of the end face 64 forming an acute angle with the opposed bearing may help promote bending of a support member 28 as an approaching loose particle 42 becomes wedged between the opposed bearing and the second end 36. The configuration of the wedge shaped side 66 and the side forming an acute angle 68 may also be formed by beveling or chamfering the sides of a support member 28, or arranging the support members in different manners as the invention is not limited in this respect.

Figure 8B:
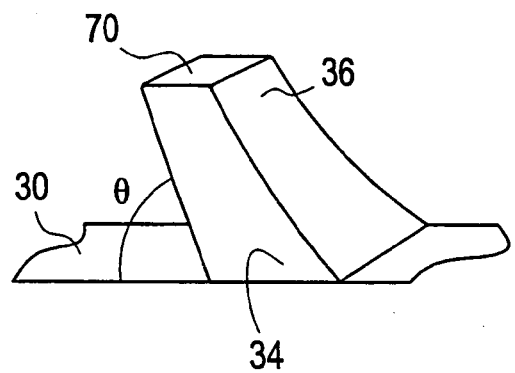

FIG. 8B shows a support member that varies in cross-sectional area along its length. Varying the cross-sectional area may help achieve a flexing characteristic desired for a particular application. It may also allow the distal end face 64 of a support member to grow in cross-sectional area should it experience any wear through prolonged contact with the opposed bearing. As the end 70 is worn away causing the length of the support member to decrease, the corresponding area 70 of the end face will increase. When this occurs over numerous support members, it will increase the net area of the compliant bearing surface. This increase in area will reduce the contact pressure experienced by each support member, which may reduce the wear rate experienced thereafter. In such a scenario, the support members will still be able to support the opposed surface even though their length may decrease. This is possible as the support members may be pre-loaded against (i.e. initially flexed) the opposed bearing surface, allowing the support members to maintain the same proximity to the opposed bearing surface as wear reduces the length of the support members.

Figure 8C:
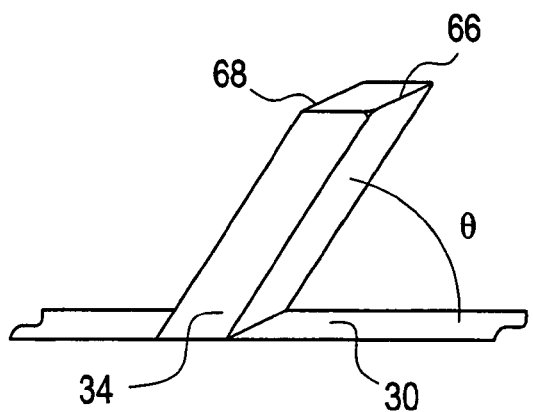
Figure 8D:
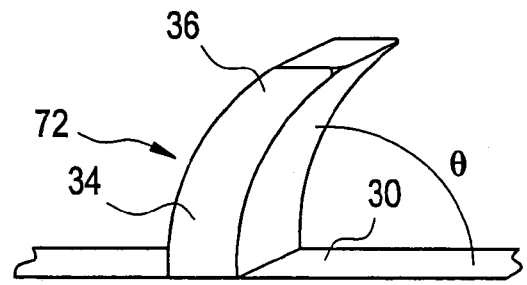

Additional embodiments of cantilevered support members 28 are shown in FIGS. 8C and 8D. FIG. 8C depicts a support member that is aligned non-perpendicular to the base 30, while FIG. 8D depicts a support member comprising an arcuate shape 72. Although the second or distal portion 36 of these support members extend in the same direction as the first portion 34, the second portion 36 may be arranged to extend from the base in other directions, whether perpendicular or non-perpendicular to the base. The arcuate shape 72 may comprise a constant curvature or alternatively a compound curvature as may be suited for a particular application. The support members 28 of any of the embodiments described herein may be used in conjunction with other identically shaped support members, or they may be used with any combination of support members described or contemplated by this invention. Although various examples of the shapes of the support members are shown, it should be appreciated that the present invention is not limited in this respect as other suitable shaped support members may be employed. Also, the support members may extend from the base in any suitable direction provided that the distal end can move to accommodate asperities or particles. Thus, although in certain embodiments, the support members are shown in particular angles θ relative to the base, any angle may be employed, provided the support can move, for example, bend or flex toward and away from the opposed surface.

Figure 9:
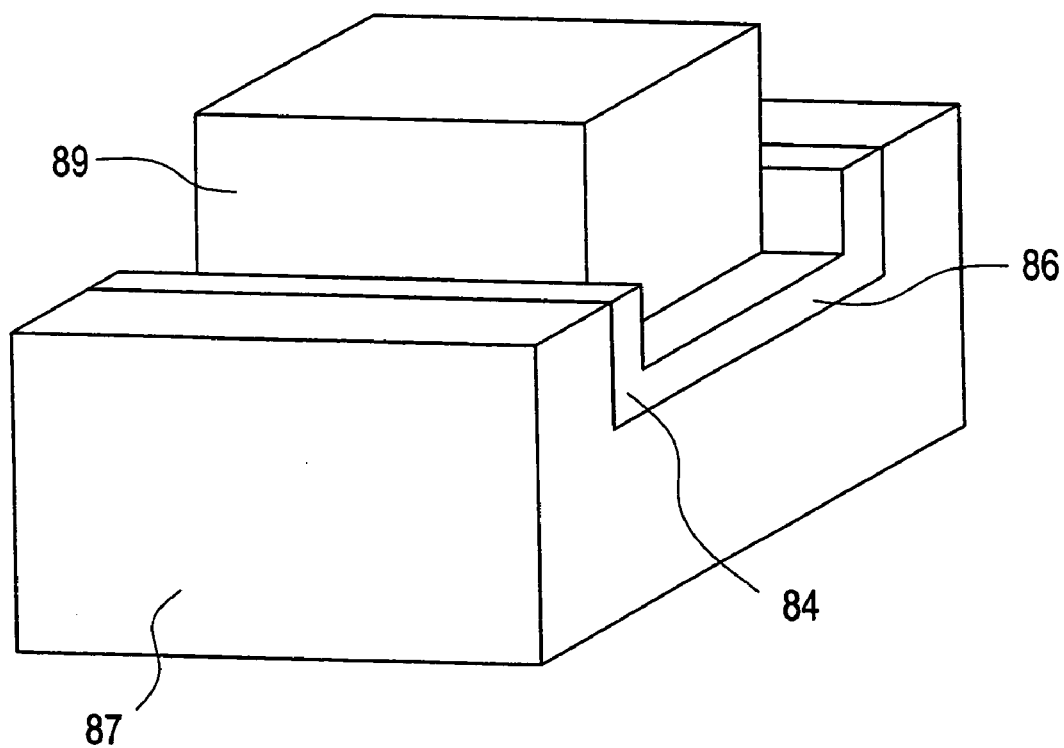
FIG. 9 is a schematic perspective representation of a system including a linear bearing according to one aspect of the invention.

FIG. 9 is a schematic view of a linear bearing 86 according to another aspect of the invention. This particular bearing 86 comprises a U-shaped cross-section 84 to guide translation in one direction; however, other embodiments may simply comprise a planar bearing such that the objects 87, 89 may translate relative to one another in multiple directions as the invention is not limited in this respect. As with the cylindrical bearing 24, the linear bearing 86 may be fixedly attached to either of the objects 87, 89, or may equivalently be allowed to float between the two objects. The linear bearing 86 may also comprise a pair of bearings, each attached to one of the objects. The linear bearings 86 may be designed to accommodate continuous, or intermittent contact between the objects 87, 89. For instance, with intermittent contact, the first object may be in an application where it slides completely off of the second object by translating past one of the edges, or it may be an application where it lifts vertically off of the bearing.

The bearing is shown opposing a conventional bearing 48, although it could also oppose another locally compliant surface 40. The particular bearing shown in FIG. 10 may allow sliding modes of motion, such as translation or rotation in directions parallel to its locally compliant surface. Other embodiments may incorporate features to limit this motion or to allow additional motion. Such additional motion may include non-sliding modes of motion, such as one bearing 86 tilting relative to the other.

Any of the features associated with the previously discussed embodiments may also be incorporated into a linear bearing configuration. Features of both linear and cylindrical bearings described herein may also be incorporated into bearings having both linear and arcuate portions. For instance, the linear bearing may have a locally compliant surface comprising a rigid base with integral support members extending therefrom, it may have an elastomeric base having support members embedded therein or any combination thereof as the invention is not limited in this respect.

As previously mentioned, other embodiments of locally compliant bearings may comprise support members extending from a base that has a resilient property, such as one formed from an elastomeric material. In some of these embodiments, the resilient property of the base alone may allow substantially rigid support members 28 to flex. In other embodiments the flexibility of support members themselves in addition to the resilient properties of the base may allow them to flex. This type of locally compliant bearing can provide the same benefits as those utilizing integral, cantilevered support members. However, it may also provide a benefit of reduced stress between the support members and the base. Some embodiments having a base with a resilient property may also prove easier to manufacture or be better suited for particular applications.

Figure 14:
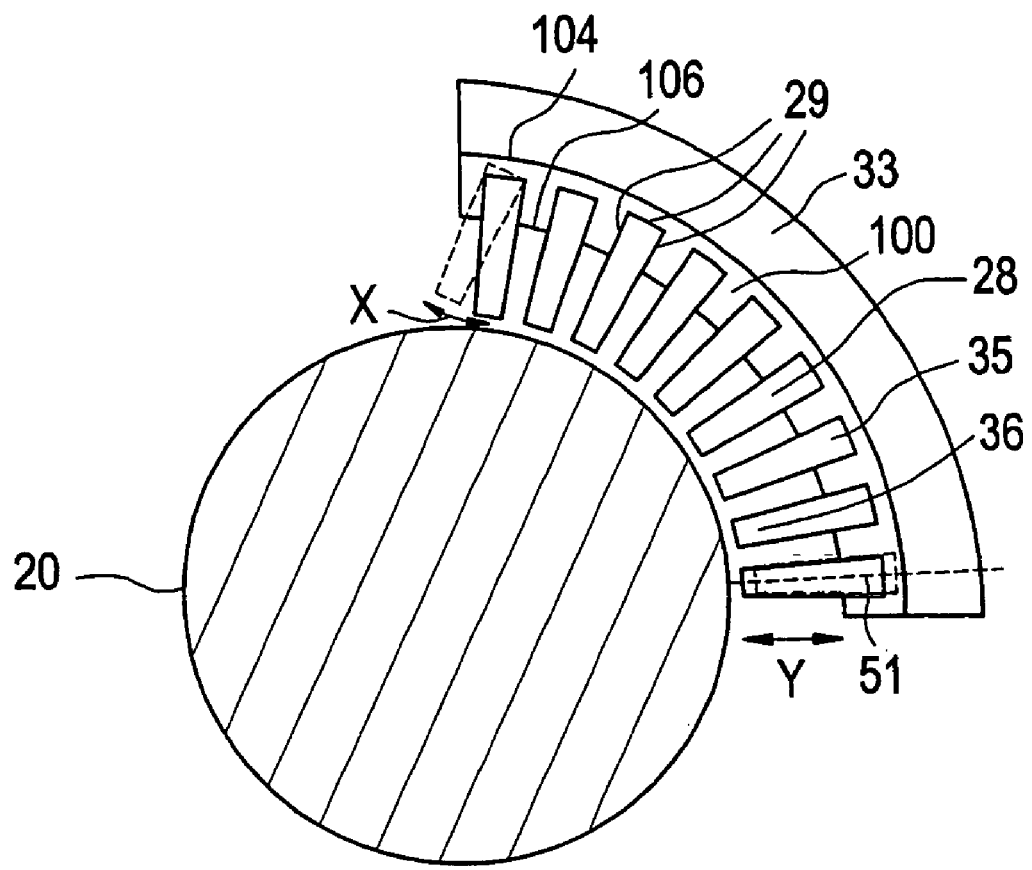
FIG. 14 is a cross-section schematic representation of a bearing according to an aspect of the invention.

FIG. 14 shows a cross-sectional view of one embodiment of a bearing having support members embedded in a base 100. The base has a resilient property. The opposed bearing surface in this example comprises a conventional shaft 20. The bearing is a portion of a cylindrical shape and includes an additional, resilient foundation or case 33 that abuts and supports the resilient base 100. The case 33 may be formed of a resilient material, such as a continuously cast elastomer; however, it may also be formed of a substantially rigid material as the invention is not limited in this respect.

While an arc of constant curvature is shown, the curvature could also vary in this or any other embodiment as the invention is not limited in this respect. In this particular embodiment, the support members do not make direct contact with the case 33, but are separated from the case by portions of the resilient base 100. Embodiments having a resilient base are able to provide the small independent motions of the support members of the locally compliant surface through pivoting or translating (linear) of the support members relative to the base 100, whereas embodiments having substantially rigid bases generally accomplish these movements through compression or bending of the support members 28. Examples of pivoting and radial translation motions are represented in FIGS. 14 by lines X and Y, respectively. When a support member pivots, its proximal end 35 remains in substantially the same place while its second portion moves. During radial translation, an entire support member moves along its own longitudinal axis 51. Of course, pivoting and linear translation can occur simultaneously in some embodiments.

When a cantilevered support member integral with a base is placed in a bending mode, most of the stress between the support member and base is concentrated at areas adjacent the transition between the base and the support member. When a support member pivots and/or translates in a base with a resilient property, the load between the support member and base can be distributed over most all of the contact surfaces 29 between the base and support member. These contact surfaces generally comprise larger areas than those adjacent the transition between the base and the support member in the case of integral cantilevered support member embodiments. As a result, a similar load can be distributed over a greater area and thereby produce lower stress in bearings with resilient bases. For example, the region over which the support member 28 is bonded to the base 100 can be the perimeter of the support member 28 multiplied by length of the embedded support member 28. This area is generally much greater than the area at the transition between the support member and the base, which may be approximately equal to the cross-sectional area of a support member.

Figure 15:
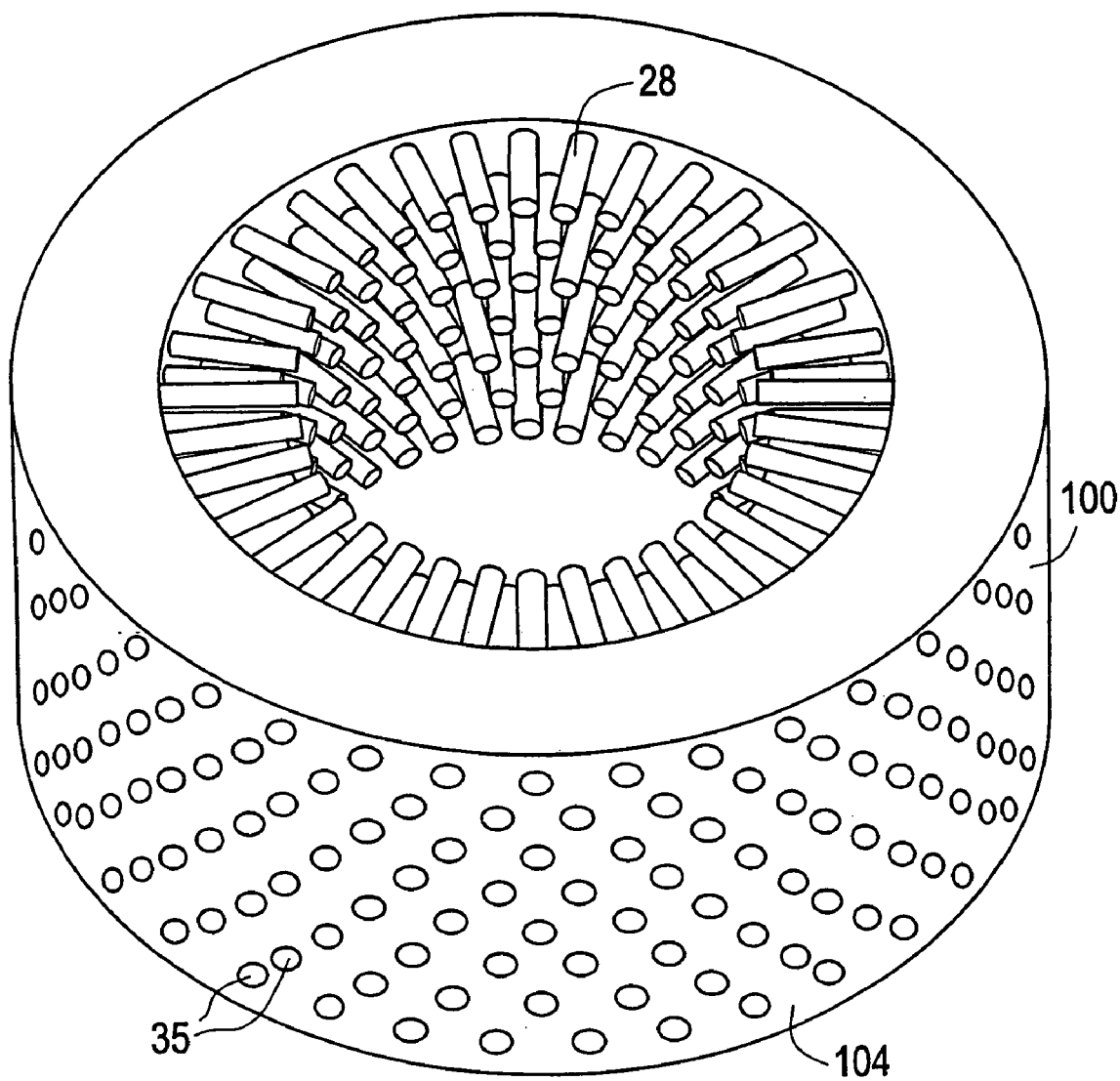
FIG. 15 is a perspective view of a bearing according to another aspect of the invention property.

FIG. 15 shows another embodiment of a contact bearing where the proximal end 35 of each cylindrical, pin-like support member is fully inserted into the resilient base 100 such that the end 35 can be flush with the outer surface 104 of a base 100 that makes contact with a supporting, external case (not shown). In this embodiment, radial translation of the support members is substantially reduced, as the support members are placed in direct contact with the resilient case 33. Radial translation may even be prevented in similar embodiments used in combination with a rigid case 33. However, in such embodiments, the support members may move independently to accommodate irregularities by pivoting, or by bending themselves if the support members are somewhat flexible. While the embodiment of FIG. 15 shows the proximal ends 35 of the support members conforming to the outer cylindrical surface of the base 100, they may also be rounded to promote pivoting against the inner cylindrical surface of the case 33. Additionally, pockets or other features may be formed in the inner cylindrical surface of the case that receives an end 35 of the support member to promote pivoting or even allow some radial movement.

Figure 16:
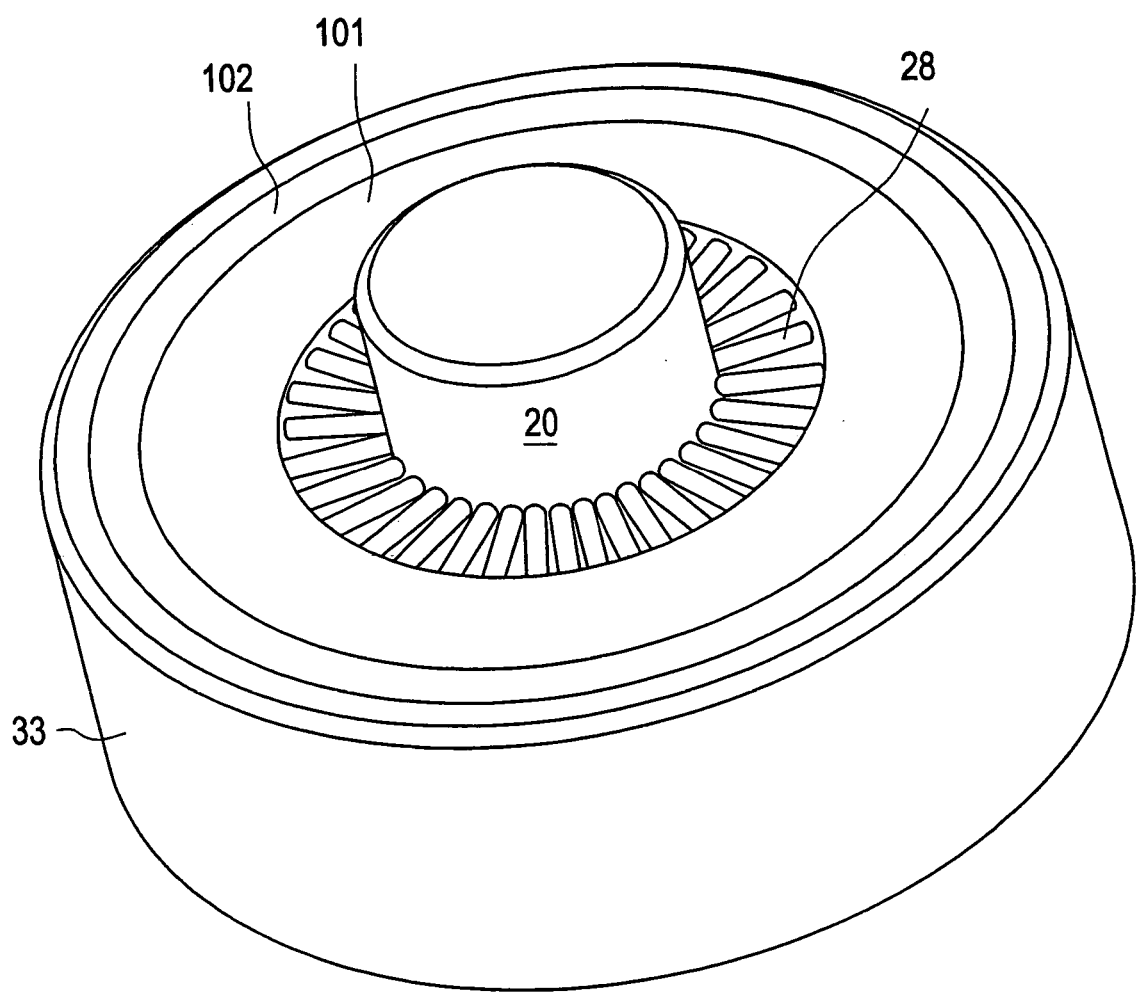
FIG. 16 is a perspective view of a bearing according to another aspect of the invention.

An embodiment of the invention having a base comprising a first elastomeric base 101 and a second elastomeric base 102 is shown in FIG. 16. This particular embodiment is similar to the one depicted in FIG. 15 except that an additional elastomeric base 102 is placed between the first elastomeric base 101 and the case 33 which may be rigid or resilient. The second base 102 can provide separation between the case 33 and the proximal ends 35 of the support members 28 yet support the end 35. This separation and support may allow the support members to independently translate in a radial direction in addition to pivoting within the elastomeric bases. The first and second bases may comprise materials having different resilient properties or identical resilient properties as the invention is not limited in this respect. The amount of pivoting and radial translation that support members are allowed to undergo can be adjusted by varying the dimensions or resilient properties (or other properties) of the different bases or the resilience of the case. As with other embodiments, the support members may be bonded to one or both of the cases. Additionally, the first and second bases 101, 102 may be bonded to one another and/or the case 33 itself.

Figure 17:
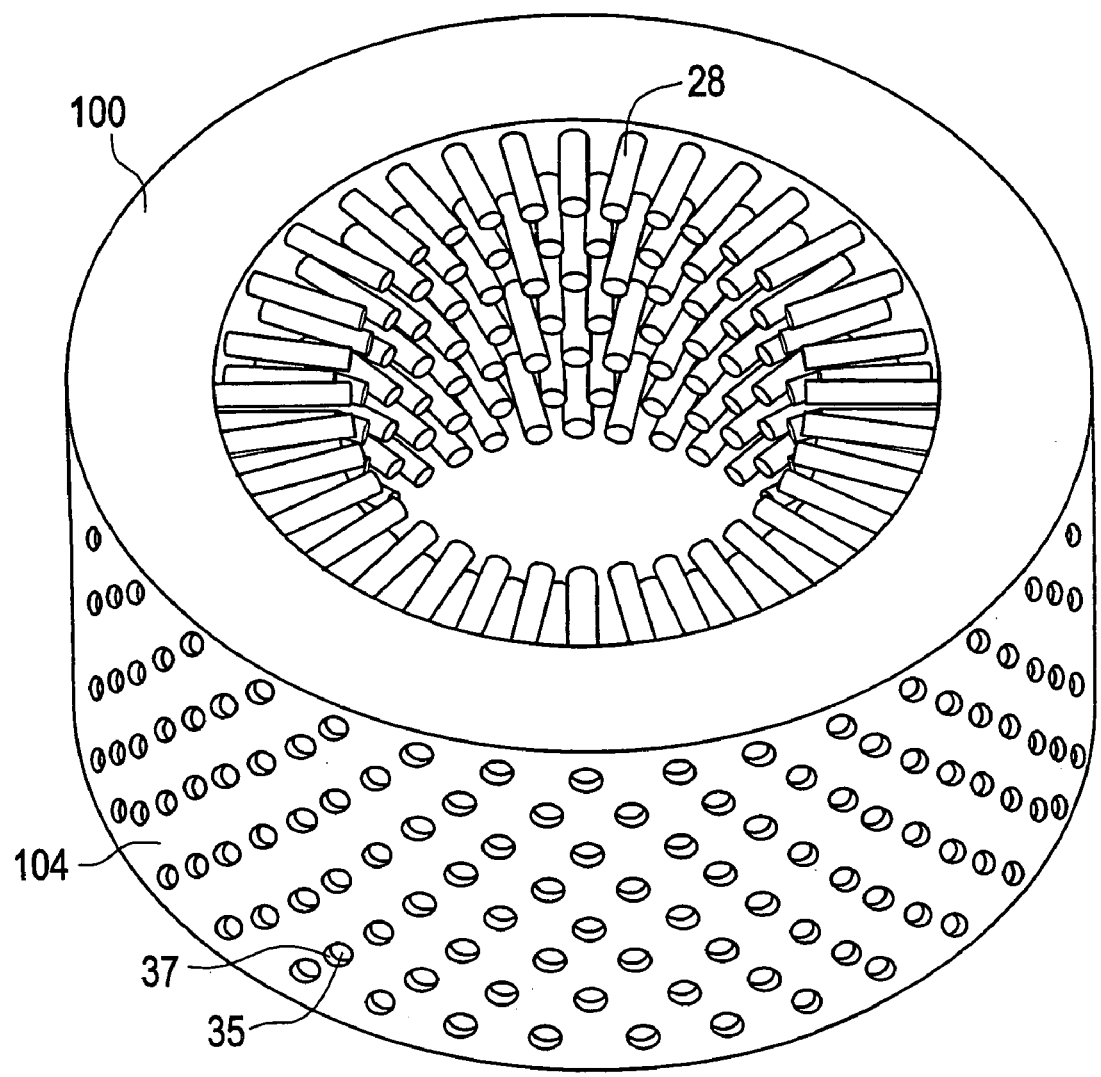
FIG. 17 is a perspective view of a bearing according to another aspect of the invention.

The embodiment shown in FIG. 17 allows radial translation of support members (i.e. movement along its longitudinal axis 51) by providing a space 37 between the proximal end 35 of each support member and the outer cylindrical surface 104 of the base 100. Similar to other embodiments, a rigid or resilient case 33 can be provided to surround and support the elastomeric base. Alternatively, this embodiment and others can be placed directly into an application where an existing foundation or case will surround and support forces transmitted through the elastomeric base 100 when the bearing is in use. The space 37 between the support member 28 and the case provides room for each support member to translate alone or in combination with pivoting action as the support members move to accommodate irregularities. In this embodiment and others, the support members may be bonded, or otherwise fixed to the resilient base. This allows them to better support a radial load in the radial direction (i.e. along in longitudinal axis) as it prevents the support members from sliding within the base in an unrestricted manner.

Figure 18:
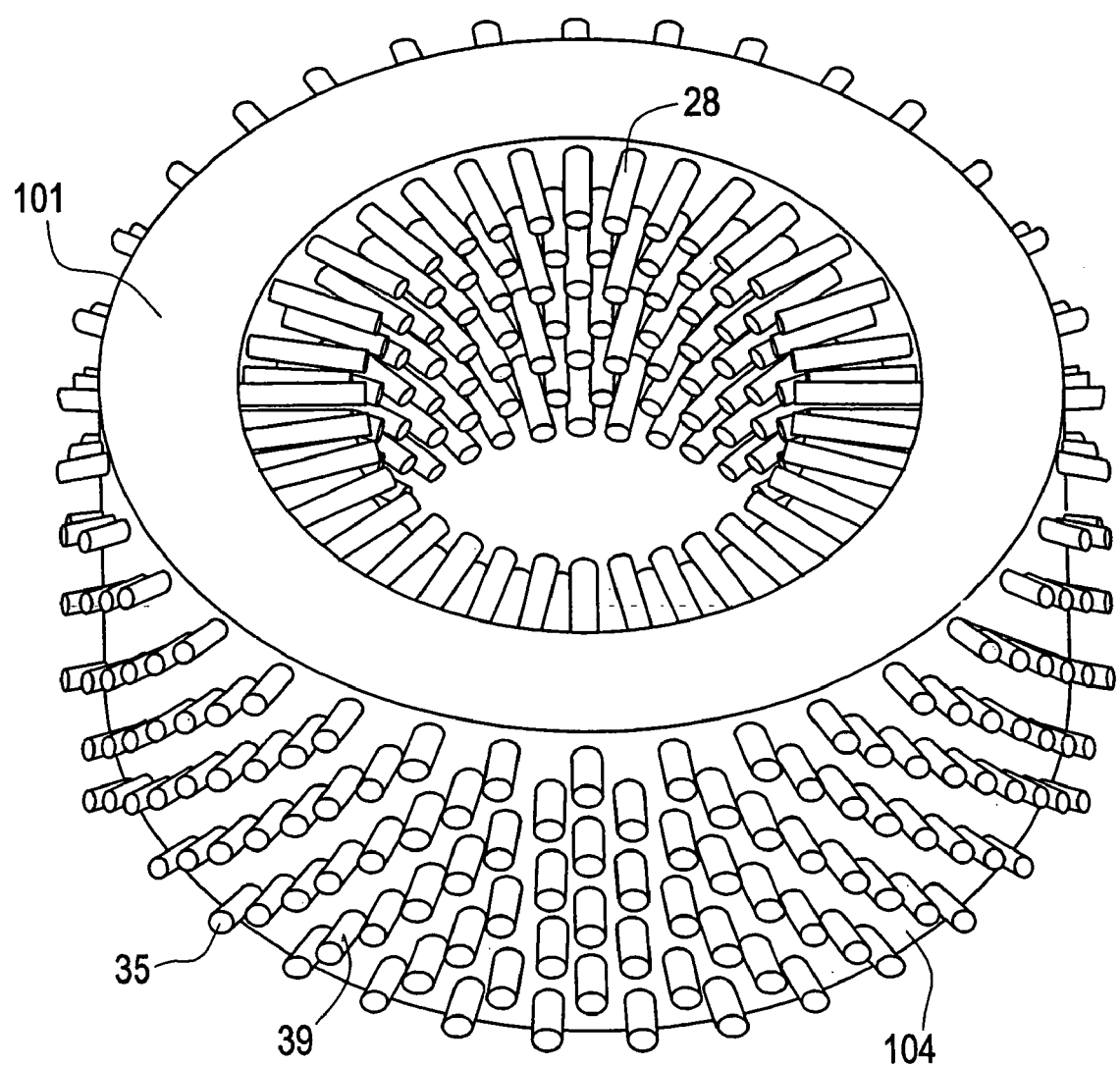
FIG. 18 is a perspective view of a bearing according to another aspect of the invention.

In the embodiment shown in FIG. 18, support members extend through either side of a first elastomeric base 101. A second elastomeric base (not shown) may be placed around the outer cylindrical surface of the first base and be bonded to the proximal portions 39 of the support members 28. The outer cylindrical surface 104 of the second elastomeric base 102 may be flush with the proximal ends 35 of the support members as in the embodiment of FIG. 15, or they may be recessed from the surface as in the embodiment of FIG. 17. Having all contact areas between the support members and both bases bonded may assist in transferring loads between the bases and the support members. However, other embodiments may have only one of the bases or none of the bases bonded to the support members, as the invention is not limited in this respect.

Figure 19:
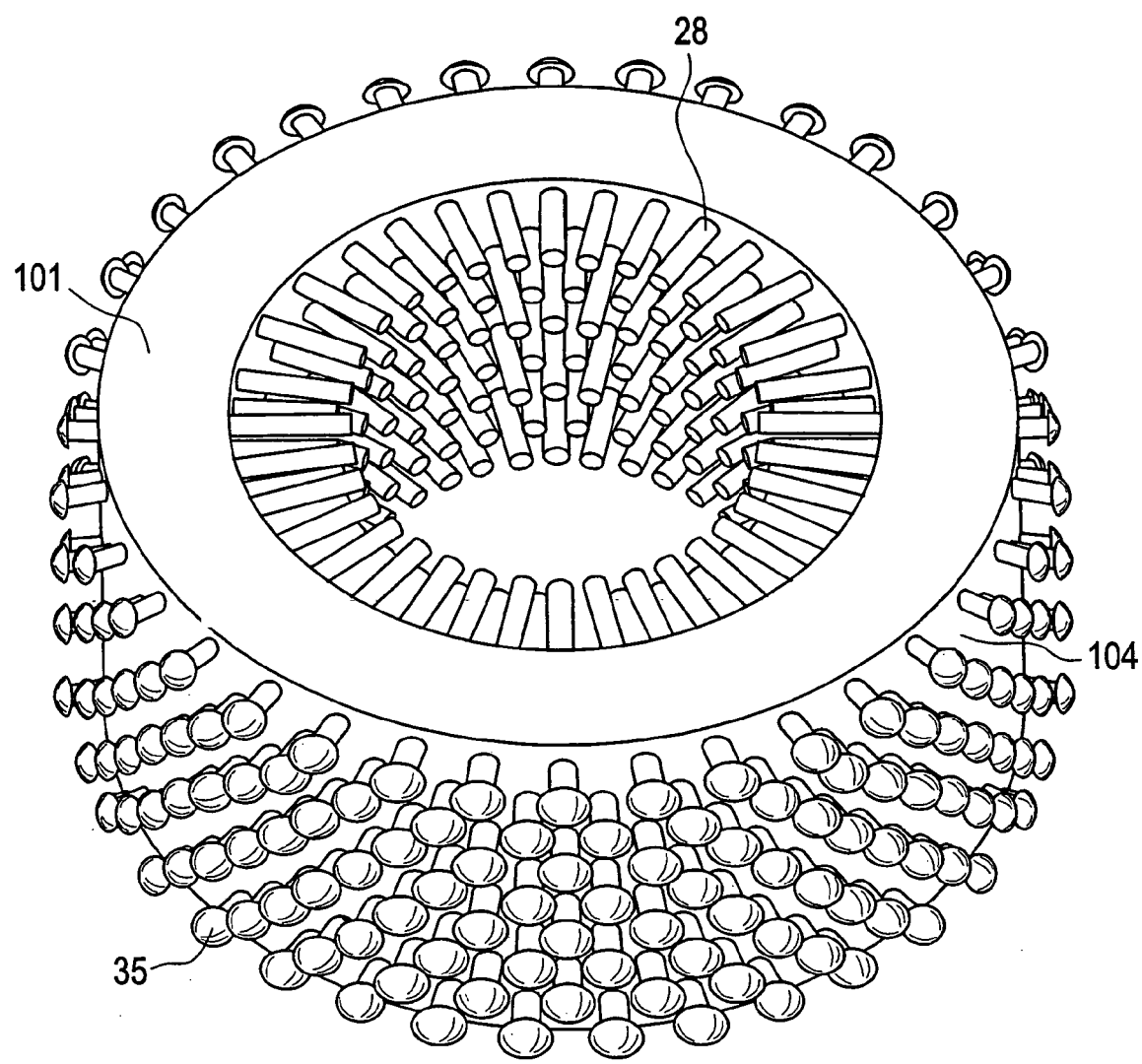
FIG. 19 is a view of a bearing according to another aspect of the invention.

Some support members 28 may be provided with a flared proximal end 35 embedded within a base 101 to provide a greater resistance to radial support member motion. FIG. 19 shows such an embodiment comprising a first and a second base (second base not shown). Such flared ends may be especially beneficial in applications where a very stiff system is required. In other embodiments, the flanged ends of the support members may be placed in direct contact with the case (not shown) whether or not a second base is not provided. Such an embodiment would limit movements in the radial (i.e. along the longitudinal axis) direction. Alternatively, having a flared end may allow a softer material to be used in the second base and may provide a system with more flexible characteristics.

Figure 20:
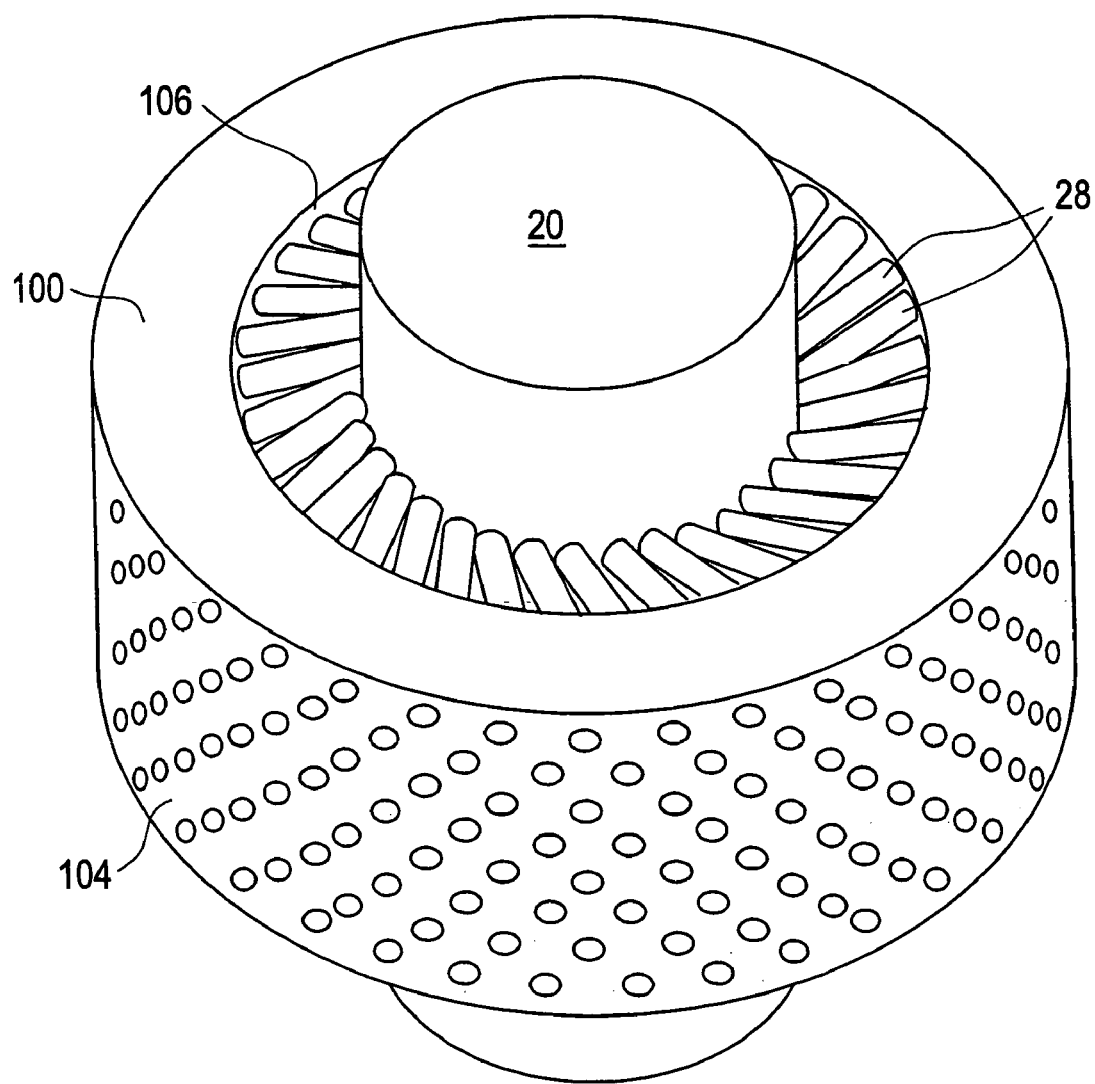
FIG. 20 is a perspective view of a bearing according to another aspect of the invention.

FIG. 20 shows one variation of an embodiment having cylindrical pin-like support members 28 extending from the base in a non-perpendicular direction. In such an embodiment, spacing between the proximal end 35 and the outer surface 104 of the elastomeric base 100 has less influence on the flexing characteristics of the support members, as the non-perpendicular arrangement of the support members pre-disposes them to pivot instead of translating radially. While these support members are shown to be extending from the base in similar directions at similar angles, other embodiments may have support members extending from the base in any direction as the invention is not limited in this respect.

Although FIGS. 15–19 show contact bearings with cylindrical, pin-like support members embedded in a base having a resilient property, any other support member shape or configuration may be used in conjunction with these or other embodiments of the invention. Additionally, the support members may comprise any of the cross section shapes, angular orientations, or other variations shown in FIGS. 8A–8D or suggested by this disclosure, as the invention is not limited in this respect.

As in bearings formed with support members integrally formed with the base, in embodiment employing a resilient base, it may be desirable to have numerous support members with small cross-sectional areas. For instance, some applications may use very stiff, yet thin wire as support members where the cross section area of the wires is approximately one square millimeter. Other embodiments may be designed to accommodate irregularities that are much larger. Some of these embodiments may accomplish this effect by having support members of significantly greater cross-sectional area and/or larger gaps 56 that are capable of removing larger particles 42. Other embodiments may accomplish similar effects by allowing several, much smaller support members to move to accommodate a larger particle. In general, for most applications the support members are sized to have a cross-sectional area that is substantially the same as the cross-sectional area of an agglomerated or foreign particle that is expected to be found in the bearing application.

Figure 14A:
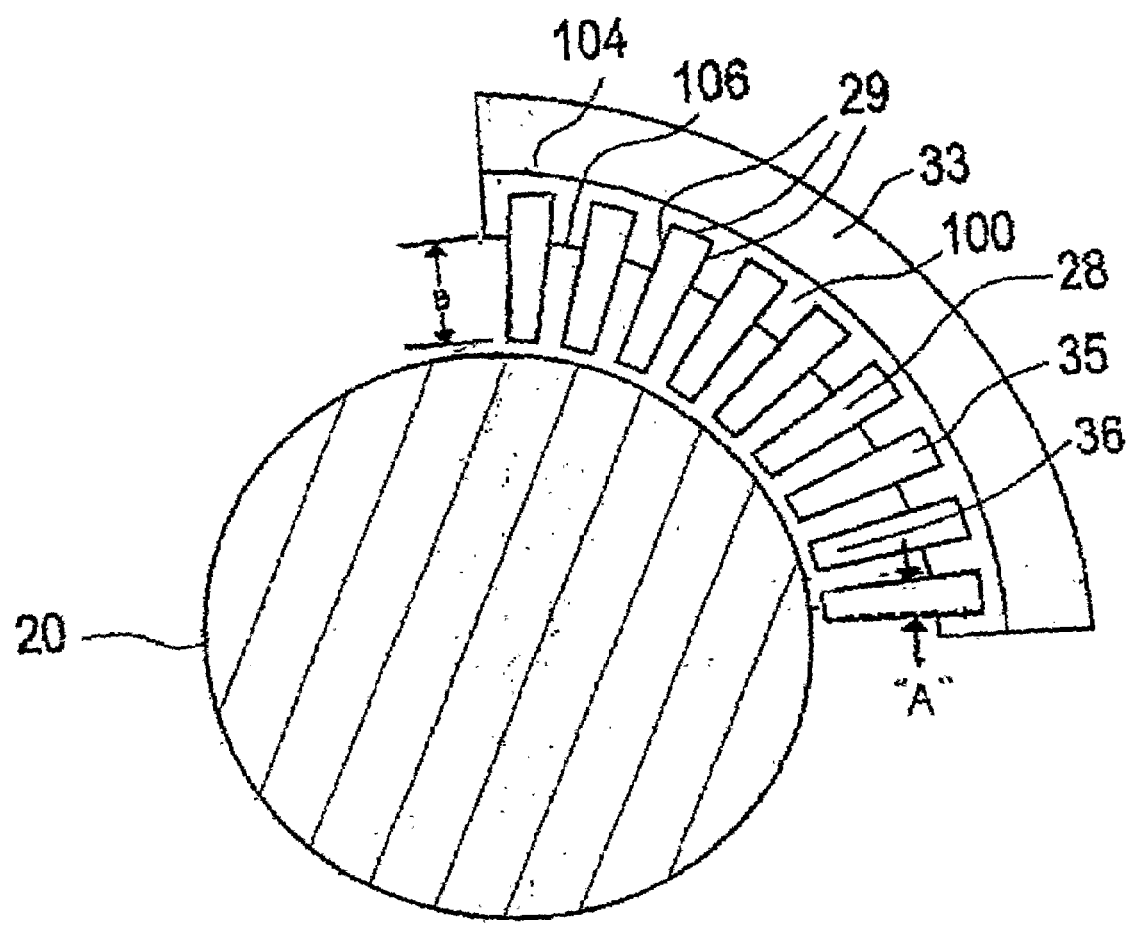
FIG. 14A shows dimensions "A" and "B" as associated with support members of one embodiment.

The support members are typically designed to extend from a surface 106 of the resilient base only up to a distance to avoid buckling the support members. This distance will generally depend on the materials used to form the support members and the cross-section geometries of the support members employed. In some embodiments a guideline that support members extend no further than three times their average, cross-sectional dimension is used to avoid support member buckling problems. FIG. 14A shows reference character "A" that represents average, cross-sectional dimension and reference character "B" that represents the distance that a portion of a support member extends from the base. These embodiments still provide enough room for support members to move and accommodate irregularities. However, the invention is not limited in this respect as buckling of support members can be avoided by adjusting other design factors, such as support member and/or base materials, and support member cross-sectional shape to name a few.

All of the illustrated embodiments having a resilient base 100 are shown with support members 28 extending substantially into the base. However, other embodiments may have the support members extending only a nominal distance into the base. Still, other embodiments may have the support members only bonded to a surface of the base. The support members of these embodiments will generally comprise larger cross-sectional areas and extend shorter distances away from the base in order to provide a more stable support member structure. In such embodiments, the support members will move primarily in a radial direction as allowed by the elastomeric base.

The resistance force provided against support members by the elastomeric base or through the bending motion of a support member itself may be designed to increase in various ways as the support members move. For instance, the resistance force may increase linearly as a support member 28 moves through a particular range of motion, or the force may increase sharply at a particular point in its motion. Different force and movement relationships may be defined by the choice of materials or manufacturing processes used to form the elastomeric bases, the shape of the support members, the particular arrangement of the support members in the base, or by other factors now known or later developed. The relationship between resistance force and support member movement may be adapted in order to control the amount of localized compliance in a particular bearing or portion of a bearing, or even the amount or type of non-sliding contact modes that will be allowed in a bearing.

Figure 21:
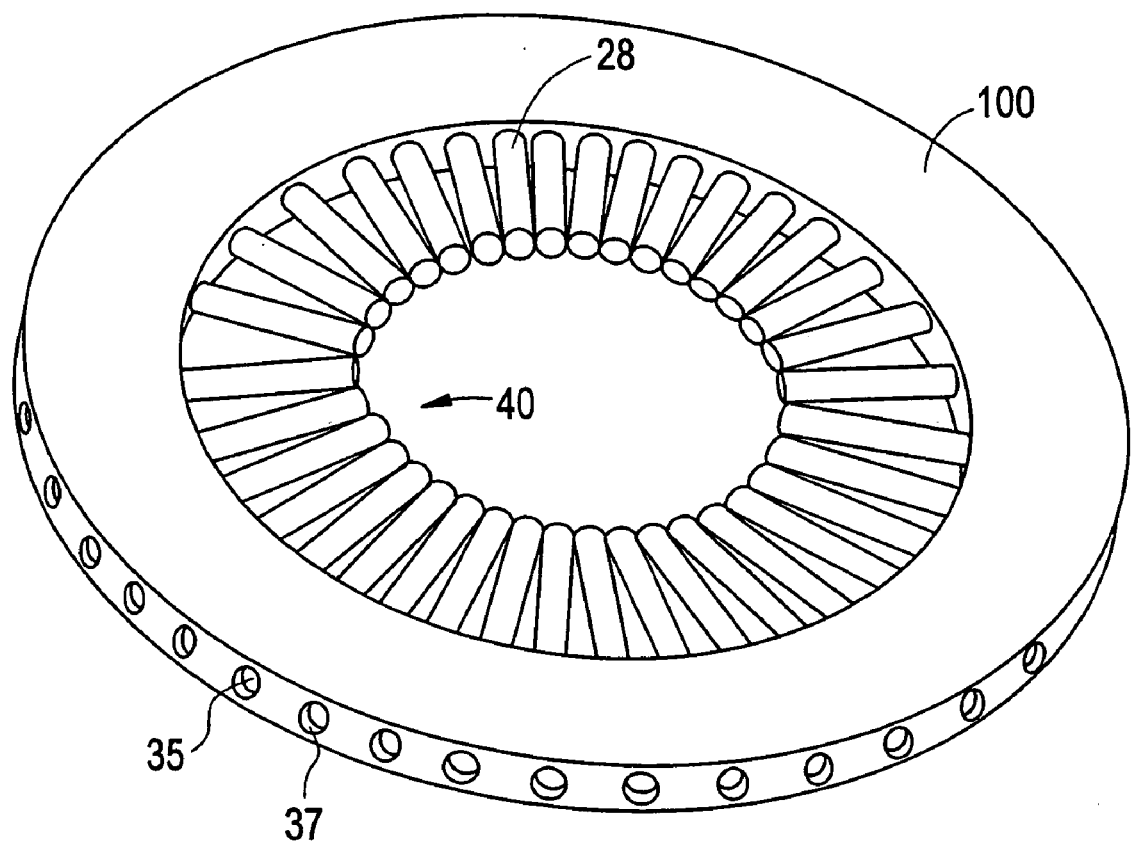
FIG. 21 is a perspective view of a plate-like structure for use in a bearing.

Various embodiments of the present invention may be manufactured through any suitable method. Any method may be used to create locally compliant surfaces with particular characteristics resulting from a mix of different support member geometries, different support member materials, different spacing between the support members or other features. For instance, in the embodiments of FIGS. 2–4, 10 and 11, a plurality of thin, washer-like disks or plates 74 are stacked next to each other to form the bearing, including the support members. An individual washer-like disc incorporating a base with a resilient property is shown in FIG. 21. Forming the bearing from a stack 82 of thin plates 74 is one way of providing certain benefits. For instance, the configuration of bearings made from stacked plates can be adjusted easily. A designer can easily configure a bearing by arranging a construction of pre-fabricated thin plate structures 74. For a particular application where a certain length of bearing or other dimension is desired, the designer may only need to decide how many thin plates 74 are needed to accommodate the particular length and what type of support members 28 the plates should have.

While the embodiment of FIGS. 2–4, 10, and 11 are shown comprising a stack of thin plates, each with support members 28 extending therefrom, other embodiments may include spacer plates (not shown) between adjacent plates. The same effect may be accomplished in embodiments manufactured through other techniques by simply creating a space on all sides of each support member. Additionally, plates having support members integral with and extending from a base may be mixed with plates that comprise support members cooperating with a resilient base like the plate shown in FIG. 21. Alternatively, a plurality of plates that comprise support members cooperating with a resilient base may be employed to form a construct bearing.

Figure 10:
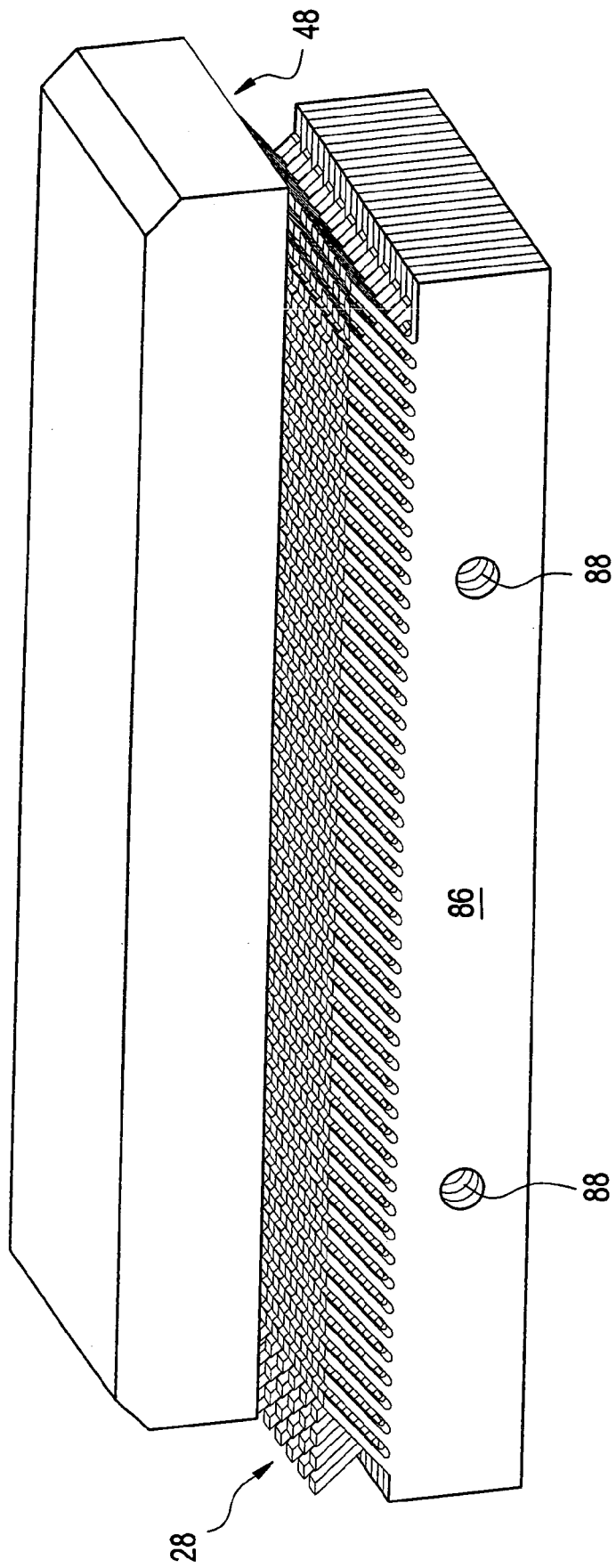
FIG. 10 is a perspective view of a linear bearing according to another aspect of the invention.

The plates forming the bearings may be attached to one another using any suitable technique. In one embodiment, as shown in FIG. 10, holes 88 in each of the plates 74 may accept a dowel, rivet or screw to align and/or lock the plates together. Other features, such as tabs, recesses at an edge of the thin plates, protrusions placed on the side of the thin plates, or even adhesives, welds, or stakes may be used to attach the plates together, as the invention is not limited in this respect. While the plates 74 are shown with a locking feature that may be used to hold them together, other applications may not require the plates 74 to be fixed with respect to one another. Some applications may even allow the plates 74 to move relative to one another during operation. Still, other applications may comprise locally compliant surfaces formed from a single piece of material, thereby eliminating the need to attach plates together as the invention is not limited in this respect.

Embodiments of bearings made of stacked plates, support members integral with a base and support members cooperating with an elastomeric base have been illustrated. Any of these embodiments, or any other embodiments can be manufactured through numerous techniques. Some of these techniques include making a locally compliant surface in whole or part by removing material from a monolithic structure through, for example, machining, wire EDM, shearing, laser cutting, or water cutting to name a few. Through other manufacturing methods, a locally compliant surface may be formed in place by a material adding process, such as stereo lithography, 3D printing, or casting, to name a few. Other embodiments may also be formed through stamping or bending of materials. The various embodiments described and contemplated by the invention may also comprise an assembly of components that define the locally compliant surface, like the thin plate structures. In embodiments where a locally compliant surface is formed from an assembly of elements, the separate elements may be attached through any suitable procedure. For instance, support members may be bonded to a base when the base is molded. The base may be bonded to a case when the base is formed. In other embodiments, support members may be embedded in a base after the base has been formed. Still other embodiments may have the support members arranged loosely within the base. Some processes that may be used to form various parts of the assemblies or even the assemblies include, but are not limited to pour molding, injection molding, extruding, casting to name a few. While a few manufacturing processes have been discussed, other suitable processes may also be used as the invention is not limited to any of the configurations or processes discussed herein.

Figure 12:
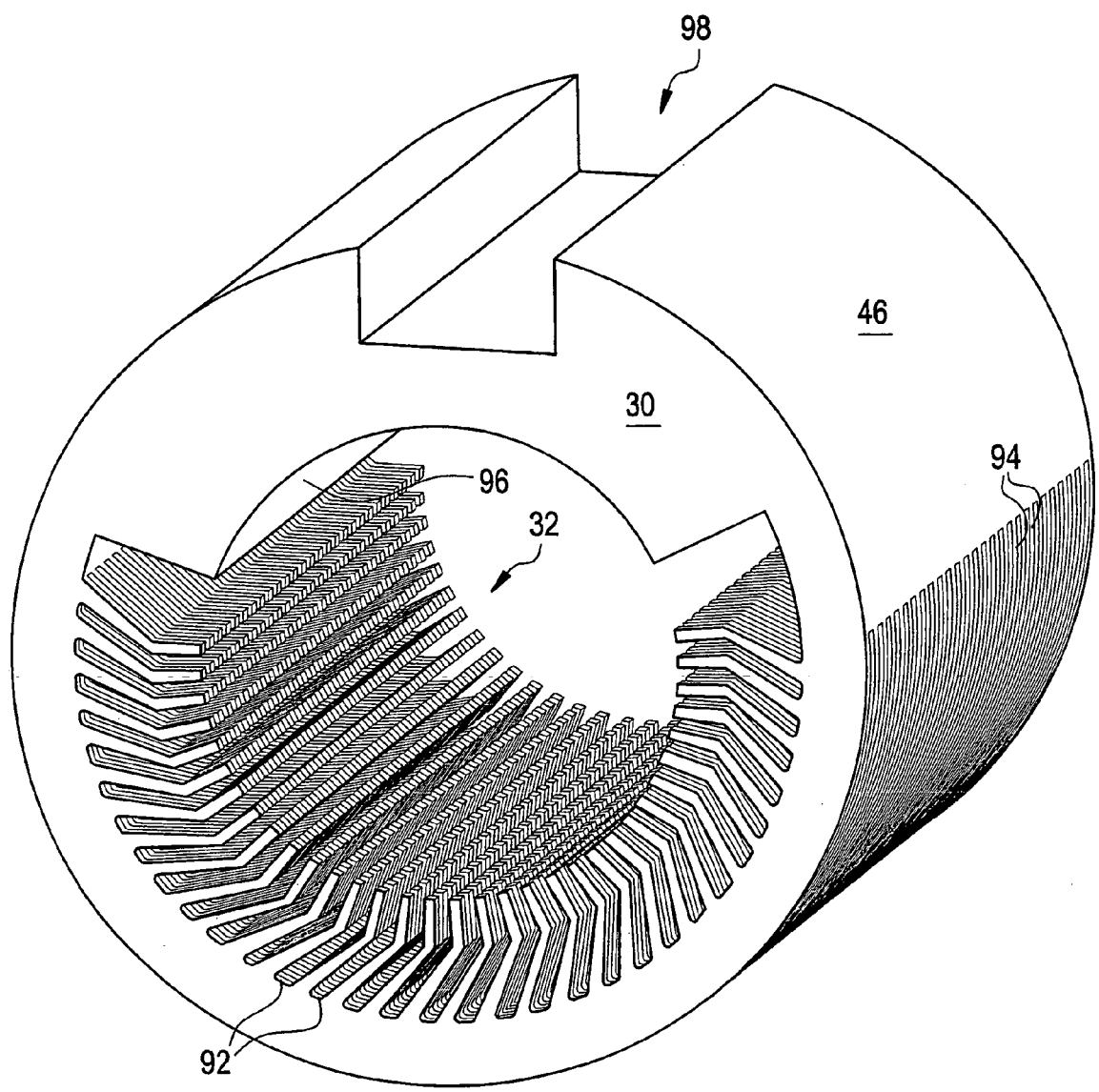
FIG. 12 is a perspective view of a cylindrical bearing according to another aspect of the invention.

FIG. 12 shows one example of a bearing that is made with a method different than those depicted in the other figures. This bearing 24 does not comprise multiple, stacked plates 74, or a resilient base but rather one solid, monolithic piece of material in which multiple support members 28 are fashioned to create a locally compliant surface 40. The locally compliant surface of this bearing is made by cutting numerous grooves 92 parallel to the central axis of the cylinder. Numerous slices 94 are also made perpendicular to the central axis of the cylinder to intersect the grooves and create numerous support members 28 extending inwardly of the base 30. In this particular embodiment, the locally compliant surface 40 does not comprise the entire inner surface 32, but rather only a portion thereof. Other embodiments can be made comprising the entire inner surface, any portion of the outer surface 46 or for any surface of other types of bearings desired. This particular bearing embodiment can be used in an application where a load is only applied in one direction. In this case, the opposite inner side 96 of the bearing comprises a conventional bearing surface that does not have a significant force applied against it. The outer cylindrical surface 46 of this embodiment contains a keyway 98 for locking the orientation of the bearing to the object which it is mounted into. This keyway, or other features accomplishing the same effect may be incorporated into other embodiments of the invention as the invention is not limited in this respect.

While particular materials have been discussed, each support member and/or base described herein can be made with a wide variety of materials or combinations or alloys of material including, but not limited to metals such as aluminum, copper, brass, bronze, steel, spring steel titanium, nickel; or non-metals, such as polymers, elastomers, rubbers, nylons, or even composites as the invention is not limited in this respect, provided the material offers the desired flexing characteristics. Additionally, support members made of different materials may be used together in the same bearing. Resilient properties may be imparted-to a base by manufacturing a base out of an elastomeric material, such as rubber or they may even be created by placing springs between the support members themselves as the invention is not limited in this respect either.

According to another aspect of the invention, as described briefly above, the contact bearing may allow non-sliding modes of motion and thereby reduce otherwise high stress contact areas. For instance, if the shaft of FIG. 1 attempts to bend about an axis other than the central, longitudinal axis in a non-sliding mode of motion, some portions of the opposed bearing surface will be moved toward the support members. Support members located in these portions will flex more than those in other portions of the bearing. In this sense, some "global" areas of the bearing (as opposed or in addition to "local" areas) may flex in response to the bending to better distribute the contact pressure. The support members that flex more allow the otherwise higher contact pressure to be distributed over a greater number of support members. This can result in a lower peak contact pressure than would be found in a conventional bearing. Lower contact pressure reduces the severity of problems associated with plowing and asperity interactions that cause wear and friction, thereby prolonging the life of the bearing.

According to another aspect of the invention as briefly described above, the contact bearing may be designed such that the compliant surface has different areas with different flexing characteristics. This may allow a bearing to be designed for specific applications where some non-sliding modes of motion may be allowed or even desired. Areas having greater flexing characteristics may be arranged to allow the opposed bearing surface to compress more or move into these areas of the, bearing. Areas having lesser flexing characteristics may be arranged in positions where the opposed bearing surface is desired to be maintained at a substantially fixed distance or substantially continuous degree of compression. In this manner, the compliant surface of a bearing can be used to provide a bearing with a particular "customized compliance".

Figure 22A:
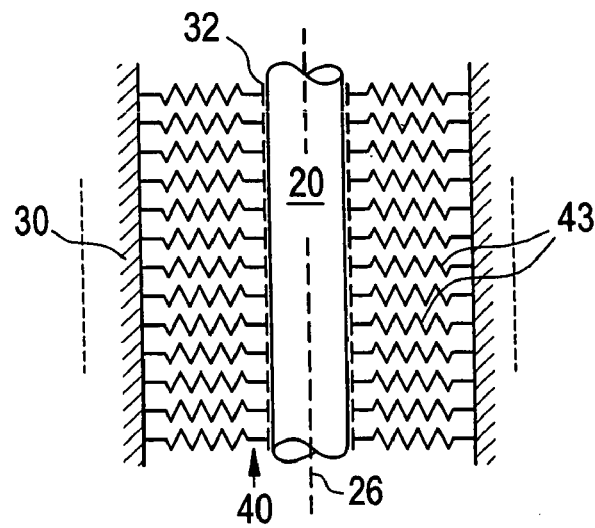
FIGS. 22A–22C show models of various modes of motion between a shaft and a bearing.

FIG. 22A depicts a model of a shaft 20 located in a cylindrical bearing with a compliant surface, such as a locally compliant inner cylindrical surface 32. Here, the flexing characteristics of various areas of the compliant surface are represented by springs 43. The flexing characteristic of each spring may be related to a spring constant 'k' that represents the amount of resistance force a spring (or equivalently, the represented one or more groups of support member 28) provides for a distance that it is moved. Some spring constants may remain substantially the same over a range of movement, while others may vary over the range of movement of the spring.

Generally, the spring constant 'k' is a function of elastomeric base material, thickness, support member length, support member cross-sectional profile, support member spacing, cantilever angle, and elastomeric base compound among other features that may be used in a particular embodiment. The equations below generally represent how different springs (or equivalently, the flexing characteristics of different areas of the bearing represented by the springs) can collectively resist a lateral force directed into a locally compliant surface, or a torque applied about an axis other than the central axis.

$$F = \int_{-\infty}^{\infty} k_{eff} \cdot \delta \cdot dy$$

where:
F=Force
$k_{eff}$=effective spring stiffness
$\delta$=distance traveled by spring
y=position along bearing surface $$T = \int_{-\infty}^{\infty} y \cdot k_{eff} \cdot \delta(y) \cdot dy$$

where:
T=Torque
y=distance from axis of rotation, taken along bearing surface
$k_{eff}$=effective spring stiffness
$\delta(y)$=distance traveled by spring (also a function of y)

Figure 22B:
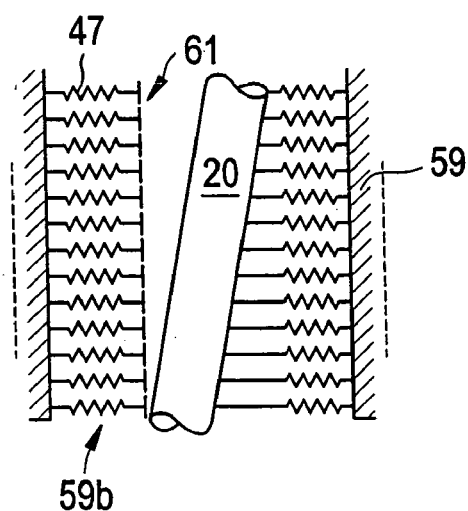

FIG. 22B shows the same embodiment of FIG. 22A; however, the shaft 22 in FIG. 22B is engaged in a non-sliding mode of motion with the locally compliant surface 40. In particular, the shaft is bending about an axis other than the central axis 26 of the shaft 20. This causes the springs 43 (or the corresponding one or more support members) in a first area 59 to be compressed a greater amount to compensate for the greater load that is being placed on them. This greater compression creates a higher pressure in the first area 59; however, the compliant nature of the support members allows this greater pressure to be distributed over this area of the surface. The pressure between the shaft 20 and an opposing second area 61 of the compliant surface is reduced when the shaft moves away from the second area. In the figure, the springs (and, equivalently the one or more support members) are shown to move out of contact with the shaft. This separation may occur in some embodiments while in other embodiments, the support members may maintain contact with the shaft or other opposed bearing surface. Whether separation occurs and/or the degree of separation that occurs can be controlled by the amount of pre-load built into the support members of a bearing, by the amount of movement that support members are capable of and by other design factors as the invention is not limited in this respect. Also, although not shown, the area 59b may also compress.

Figure 22C:
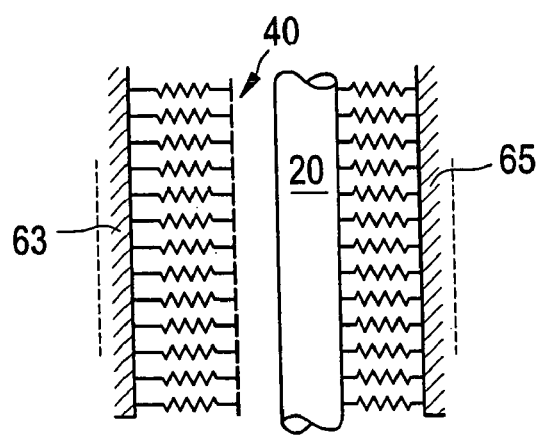

FIG. 22C depicts a different, non-sliding mode of motion where the shaft is moving laterally into one side 65 of the locally compliant bearing. In this mode of motion, the entire side 65 of the bearing is being compressed. As with the mode shown in FIG. 22B, the opposed side 63 of the bearing is shown to separate from the shaft, although it could also maintain contact with the shaft at a lower pressure in other embodiments. While FIGS. 22A–22C depict a model of a shaft located in a cylindrical bearing, similar non-sliding modes of motion and others can occur in different embodiments of the invention.

Figure 23A:
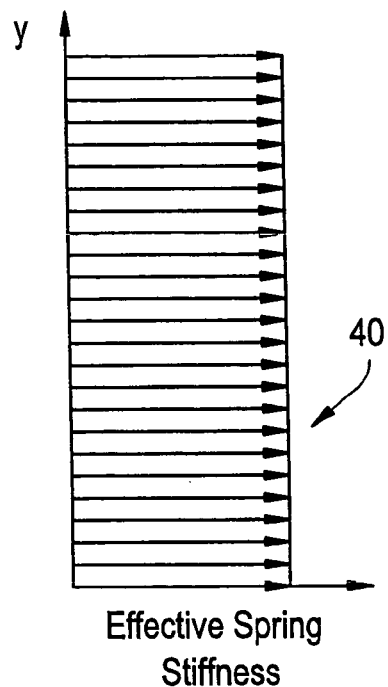
FIGS. 23A–23D show example representations of stiffnesses of bearings.

FIGS. 23A–23D depict how flexing characteristics of various areas of the cylindrical bearing can be arranged to substantially allow certain non-sliding modes of motion and substantially resist other non-sliding modes of motion. In these figures, the length of the arrows 67 represents the strength or stiffness of a spring constant 'k' and thus the strength of the flexing characteristics of the corresponding area of the compliant surface. A longer arrow indicates a stronger or stiffer spring constant and thus greater resistance to the collective movement of support members in that area. Specifically, FIG. 23A depicts a compliant surface 40 with substantially consistent flexing characteristics over its surface. The net, effective spring stiffness over this entire surface may be increased or decreased to substantially allow more or less of lateral, non-sliding modes of motion. It may also be increased enough to prevent lateral, non-sliding modes of motion. Such a bearing with consistent flexing characteristics over its surface does not generally allow rotational, non-sliding modes of motion. However, other design factors not represented in this figure may allow or prevent some rotational, non-sliding modes from occurring. For instance, bearings with a greater length may serve to resist rotational, non-sliding modes of motion. Additionally, in other embodiments, a compliant surface with consistent flexing characteristics as depicted may be adjacent to or opposed from another compliant surface with consistent flexing characteristics of a different magnitude. Such a combination of surfaces may allow lateral modes of motion in one direction while preventing them in another. Similar features can also be incorporated to allow and/or prevent rotational, non-sliding modes of motion in particular directions.

Figure 23B:
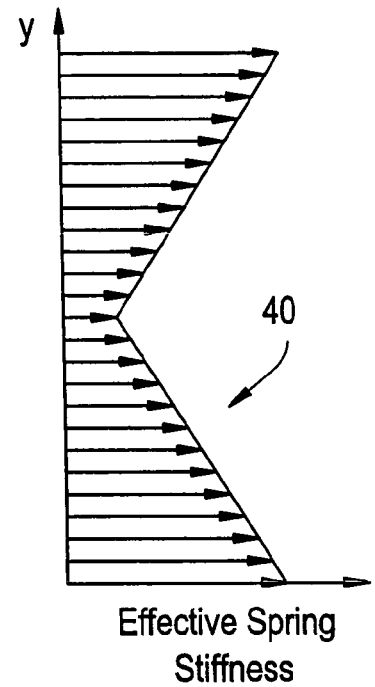
Figure 23C:
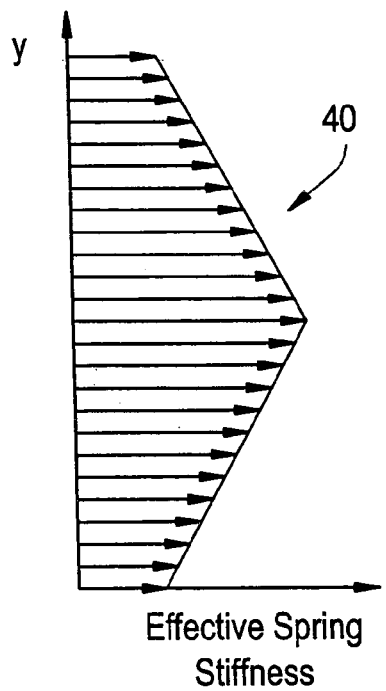
Figure 23D:
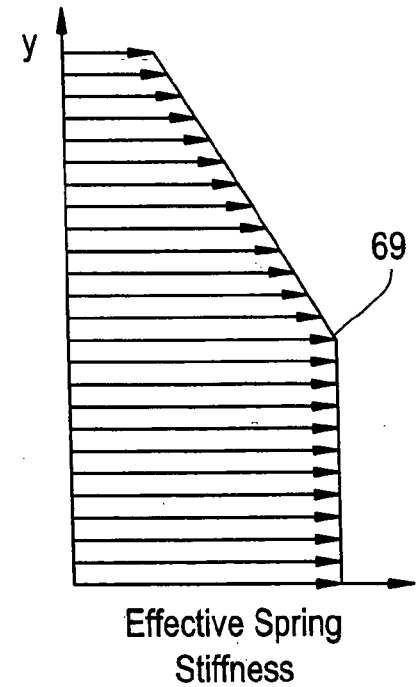

FIG. 23B depicts an embodiment where rotational modes of motion are substantially resisted. Here, areas with more resistance to flexing are (greater spring stiffness) placed near the outer edges of the bearing while areas with less resistance are placed near the center. The net stiffness over the entire bearing surface may be the same as that shown in FIG. 23A, which can allow this bearing to support sliding modes of motion for opposed bearing surfaces in many ways similar to that of FIG. 23A. However, in this embodiment, rotational modes will be resisted more than they are in the embodiment of FIG. 23A due to greater relative spring stiffnesses near the bearing edges. Lateral, non-sliding modes of motion will be resisted or allowed to the same degree as the embodiment of FIG. 23A if the net, effective spring stiffness over the entire bearing surface is similar. However, embodiments like those shown in FIGS. 23A and 23B may also have different, net, effective spring stiffness and resist or allow lateral, non-sliding modes of motion differently than the embodiment of FIG. 23A as the invention is not limited in this respect. FIG. 23C shows another embodiment where rotational, non-sliding modes of motion are allowed more so than in the embodiments of FIGS. 23A and 23B due to relatively lower spring stiffness near the bearing edges. This embodiment may or may not also allow some lateral, non-sliding modes of motion depending on the net, effective spring stiffness over the entire bearing surface. The embodiment depicted in FIG. 23D is one that substantially allows rotational, or pivoting motion of an opposed bearing surface above a transition point 69. In this bearing, the flexing characteristics above the transition point 69 are relatively lower than those below the point, which are substantially consistent.

Bearings that allow certain non-sliding modes of motion by having areas with different flexing characteristics may be realized in various different ways. For instance, in the various embodiments depicted in the figures, as with others, plates 74 of varying thickness, plates 74 made of different materials and/or plates with different types or shapes of support members 28 may be mixed to provide different flexing characteristics in particular areas of the bearing. Placing plates with stiff properties near the outer edges of a cylindrical bearing may provide an arrangement like that depicted in FIG. 23B. Compliant bearings made from configurations other than a plurality of plates may accomplish the same effects. Some other features that may be adjusted to allow areas of a bearing to have different flexing characteristics include support member spacing, support member length, support member cross-section, support member and/or base material to name a few, as the present invention is not limited in this respect.

Figure 11:
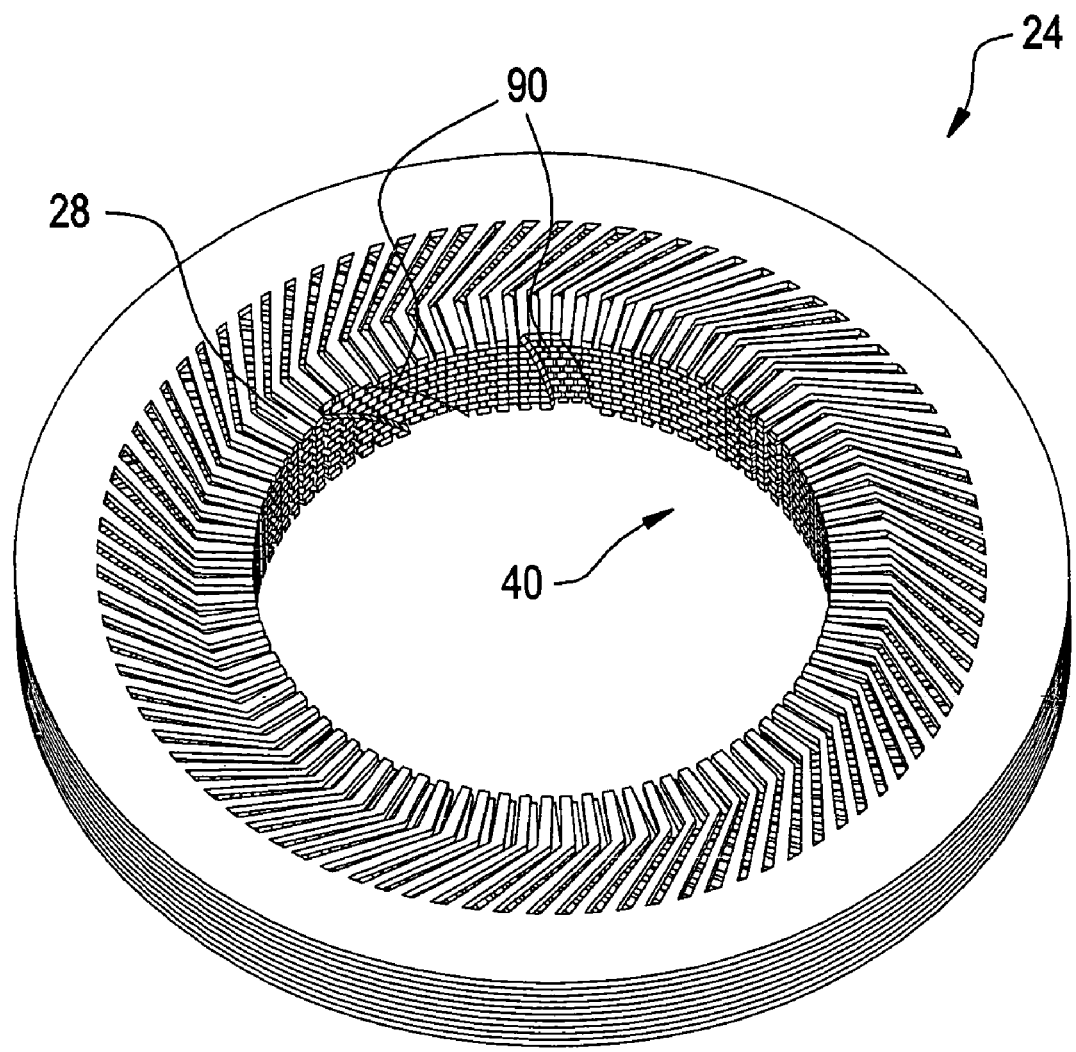
FIG. 11 is a schematic perspective representation of a locally compliant bearing according to an aspect of the invention.

FIG. 11 shows yet another feature that may be incorporated in a bearing of the present invention. Here, the contact bearing 24 is shown with grooves 90, which may be helically shaped, disposed on the compliant surface 29. These grooves act as a particle trap that may help remove loose particles 42 (not shown) from between the bearing surfaces. As a shaft 20 (not shown) rotates relative to the compliant surface 29, any particles 42 will be allowed to fall into the groove 90 and thereafter will be trapped or pushed out one side of the bearing 24 for removal. Such grooves help to remove foreign particles 42 that are too large to fit in the gaps 56 disposed between the support members 28. While the groove is shown to be a lie in a helix extending continually from one side to the other, it is not limited to this configuration. The groove 90 may also be linear or comprise any other shape that serves to remove particles 42 disposed between the bearings, as the invention is not limited to any particular shape. Furthermore, the grooves do not need to extend completely from one side of the bearing to another. For instance, a groove 90 may begin near the middle and extend towards only one lateral side, or there may be multiple grooves extending from near the center of the surface towards alternating sides of the bearing. While the groove 90 is shown associated with a cylindrical bearing 24, it may also be present in linear bearings 86 described above with reference to FIGS. 9 and 10, or any other bearing configurations, as the invention is not limited in this respect.

Figure 13:
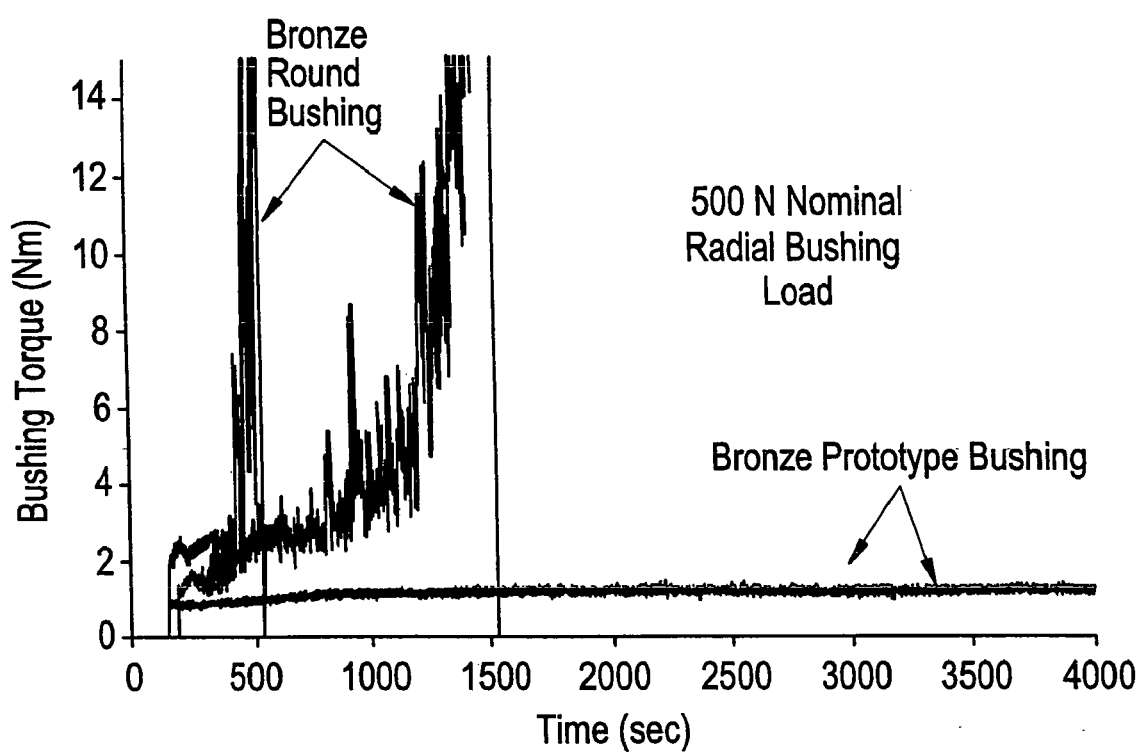
FIG. 13 is a graph of experimental results obtained in part with the embodiment shown in FIG. 12.

FIG. 13 displays the results of a test performed on both a prototype bearing with a compliant surface similar to that shown in FIG. 12, and a conventional bearing. Both the prototype and conventional bearing were manufactured from the same aluminum-bronze alloy material. A nominal load of 500 Newtons was applied against each bearing through a shaft manufactured from hardened 1060 steel, which was rotated within each bearing. A torque associated with friction was measured for each bearing as the test progressed. FIG. 13 shows the torque associated with each bearing as it changed over the time in which the test was performed. The frictional torque value associated with the bearing of FIG. 12 in each test trial remained substantially constant over time. However, the frictional torque associated with the conventional bearing increased dramatically after a relatively short period of time. This increase is associated with excessive wear, asperity interaction or other irregularities and ultimately the failure of the conventional bearings. Further tests were performed where a sand mixture consisting of particles less than 0.4 millimeters in diameter was added to both the conventional and prototype bushings. In this test (the results of which are not depicted), the frictional torque experienced by the bearing of FIG. 12 did increase; however, the bearing did not fail during the test period. The conventional type bearing seized immediately after the sand mixture was introduced.

Other embodiments of the invention may include compliant surfaces applied to rolling contact bearings. While such bearings are primarily designed for rolling contact, they do have a sliding component of friction and wear on a micro level. Suitable applications of compliant surfaces may be used on rolling contact bearings to reduce wear and friction, in addition to making the systems more robust and resistant to impact loading.

Having described several embodiments of the invention in detail, various modifications and improvements will readily occur to those skilled in the art. Such modifications and improvements are intended to be within the spirit and scope of the invention. Further, any of the features of the bearing described in the embodiments may be used singularly or in any suitable combination, as the present invention is not limited in this respect. Accordingly, the foregoing description is by way of example only and is not intended as limiting. The invention is limited only as defined by the following claims and the equivalence thereto.

What is claimed is:

1. A contact bearing for rotatably supporting a shaft, the contact bearing comprising:
    a first elastomeric base adapted to be positioned axially around an outer circumference of the shaft, the first elastomeric base having an outer circumference;
    a plurality of cantilevered support members nested within the first base in a matrix pattern and extending radially inward from the first base, each support member having a radially inner distal end adapted to be in direct, supporting contact with the shaft;
    a second elastomeric base radially positioned around the outer circumference of the first base, each support member having a radially outer proximal end flush with the outer circumference of the first base and in contact with the second base; and
    a case supporting the second base;
    each of said support members is adapted to independently translate radially and pivot with respect to the first and second elastomeric bases so as to be locally compliant with the shaft thereby accommodating any irregularities between the respective distal ends of the support members and the shaft.

2. The contact bearing of claim 1, wherein the first elastomeric base comprises a first flexible material having a first resilient property and wherein the second elastomeric base comprises a second flexible material with a second resilient property, wherein the first resilient property is different from the second resilient property.

3. The contact bearing of claim 1, wherein the plurality of support members comprises a set of substantially rigid support members.

4. The contact bearing of claim 1, wherein the first elastomeric base comprises a first flexible material having a first resilient property, wherein the first resilient property varies with movement of at least one of the support members in the first elastomeric base.

5. The contact bearing of claim 1, wherein each support member has an average, cross-sectional dimension and wherein each support member extends inwardly from the first elastomeric base no further than 3 times the average, cross-sectional dimension.

6. The contact bearing of claim 1, wherein each support member is bonded to the base.

7. The contact bearing of claim 1, wherein each support member has a cross-sectional area of less than one square millimeter.

8. The contact bearing of claim 1, wherein a packing ratio is defined by an area of contact between the inner distal ends of the plurality of support members and the shaft divided by a projected area of a surface of the shaft that the support members are constructed and arranged to support, wherein the packing ratio is between 0.5 and 0.6.

9. The contact bearing of claim 1, wherein an area through which each support member engages the first elastomeric base is larger than an area of contact between the inner distal ends of the plurality of support members and the shaft.

10. The contact bearing of claim 1, wherein the plurality of support members comprises a plurality of elongated, pin-like support members.

11. The contact bearing of claim 10, wherein each of the plurality of elongated, pin-like support members comprises a circular cross section.

12. The contact bearing of claim 1, wherein the first elastomeric base is molded around the plurality of support members.

13. The contact bearing of claim 1, in combination with the shaft.

* * * * *